(12) United States Patent  
Kikuchi et al.

(10) Patent No.: US 6,646,973 B2
(45) Date of Patent: Nov. 11, 2003

(54) DISK DEVICE HAVING DISK TRANSFERRING MECHANISM CAPABLE OF SHORTENING DISK REPLACEMENT TIME

(75) Inventors: Hideo Kikuchi, Miyagi-ken (JP); Takashi Nakashima, Miyagi-ken (JP); Hitoshi Ikeda, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 108 days.

(21) Appl. No.: 09/804,097

(22) Filed: Mar. 12, 2001

(65) Prior Publication Data

US 2001/0021156 A1 Sep. 13, 2001

(30) Foreign Application Priority Data

Mar. 13, 2000 (JP) .......................... 2000-074006

(51) Int. Cl.[7] .............................................. G11B 17/04
(52) U.S. Cl. ...................................... 369/77.1; 369/77.2
(58) Field of Search .............................. 369/75.2, 77.1, 369/191, 193, 192, 77.2, 75.1, 36, 37; 360/92, 85

(56) References Cited

U.S. PATENT DOCUMENTS

| | | | | | |
|---|---|---|---|---|---|
| 5,831,956 | A | * | 11/1998 | Sawai et al. ............... | 369/75.2 |
| 5,878,011 | A | * | 3/1999 | Nakamichi ................. | 369/75.2 |
| 6,345,030 | B1 | * | 2/2002 | Sakurai et al. .............. | 369/192 |
| 6,392,980 | B1 | * | 5/2002 | Sato et al. .................. | 369/192 |
| 6,449,234 | B1 | * | 9/2002 | Ahn et al. .................. | 369/77.1 |
| 6,452,888 | B1 | * | 9/2002 | Eguchi ....................... | 369/77.1 |
| 6,469,971 | B1 | * | 10/2002 | Sato et al. .................. | 369/77.1 |
| 6,469,972 | B1 | * | 10/2002 | Morimoto et al. ......... | 369/77.1 |
| 6,473,372 | B2 | * | 10/2002 | Yoshida et al. ............ | 369/30.9 |
| 6,477,121 | B1 | * | 11/2002 | Sato et al. .................. | 369/30.88 |
| 6,480,442 | B1 | * | 11/2002 | Nakatani et al. .......... | 369/30.36 |
| 6,512,730 | B1 | * | 1/2003 | Lee et al. ................... | 369/77.1 |

FOREIGN PATENT DOCUMENTS

JP     Hei 06-111443     4/1994

* cited by examiner

Primary Examiner—William Klimowicz
Assistant Examiner—Minh Le
(74) Attorney, Agent, or Firm—Brinks Hofer Gilson & Lione

(57) ABSTRACT

There is provided a disk device capable of shortening a replacing time for a disk. The disk device comprises one insertion/ejection slot; transferring means for transferring the inserted disk; and a driving unit which can be ascended or descended in a direction (z), each of a first driving position and a second driving position is set at different positions in the direction (z); the transferring means has a distributing plate for selectively changing over an orientation of the inserted disk toward either the first driving position or the second driving position; each of the first driving position and the second driving position is arranged on an advancing path for the disk transferred of which orientation is changed over by the distributing plate, one disk left in the disk device of the disks transferred by the transferring means to either the first driving position or the second driving position is loaded in the driving unit ascended or descended and moved in correspondence with the position of the disk and then the disk is driven.

5 Claims, 23 Drawing Sheets

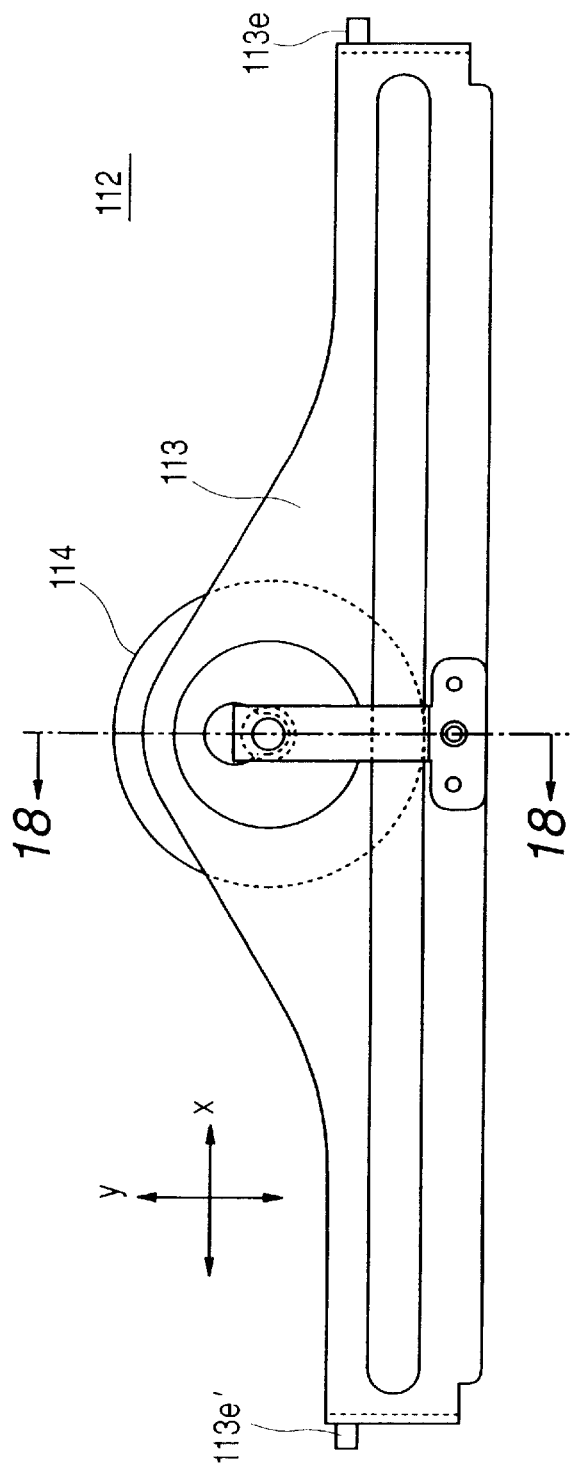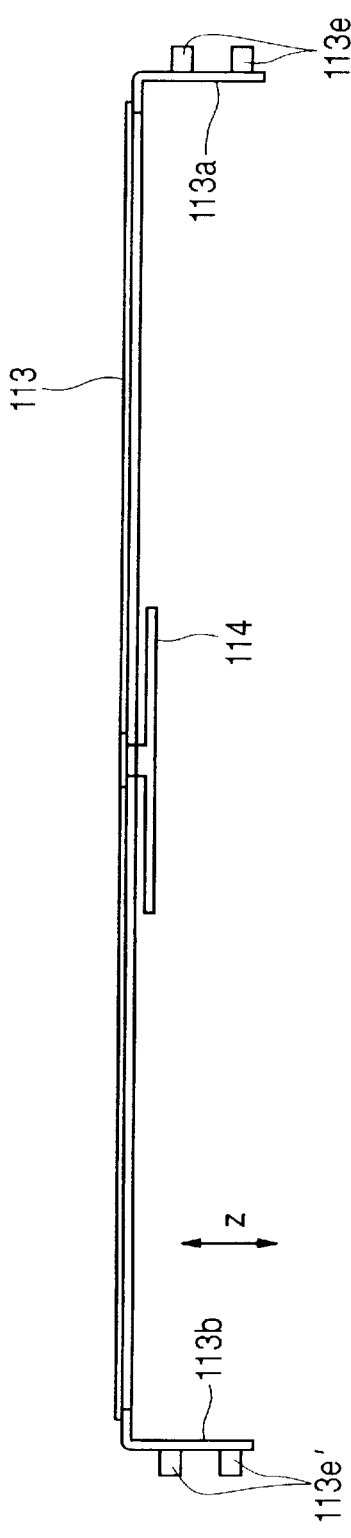

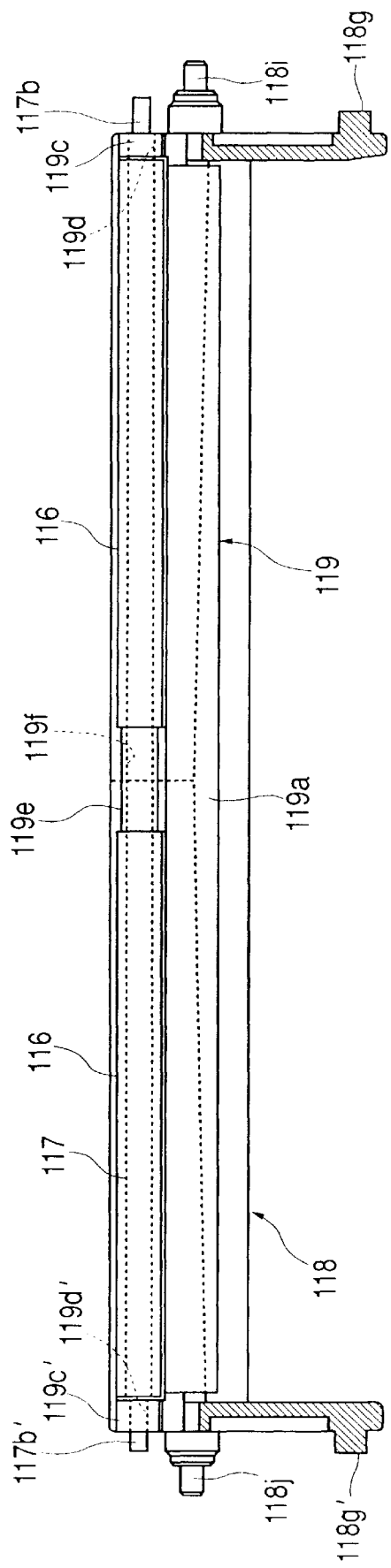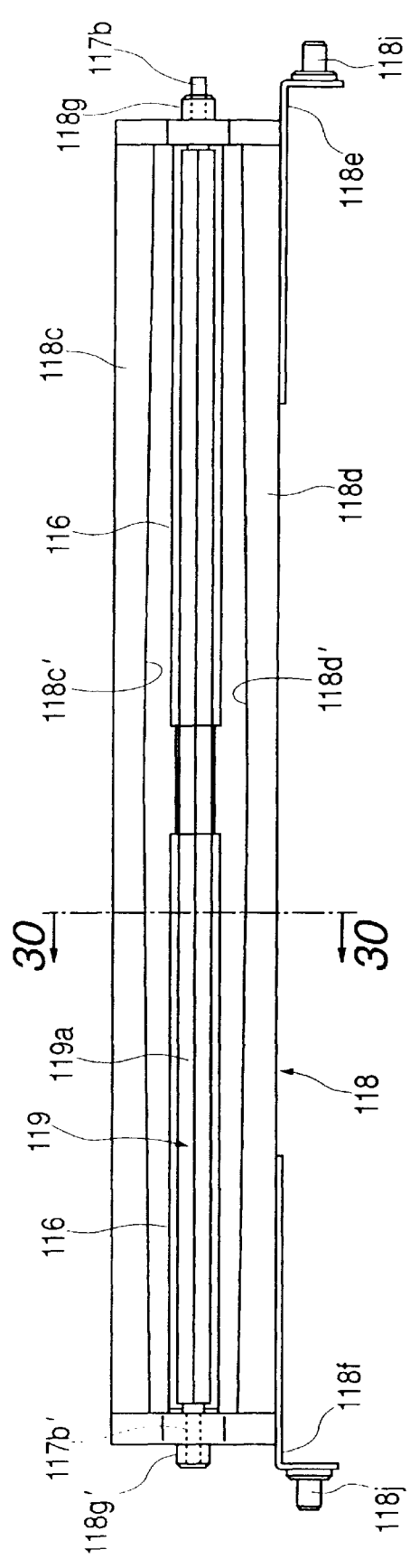

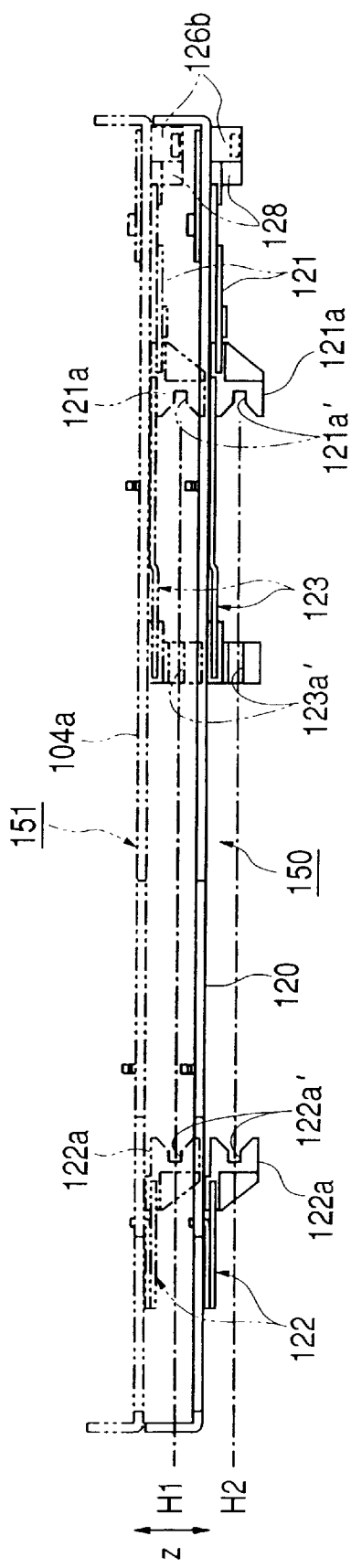
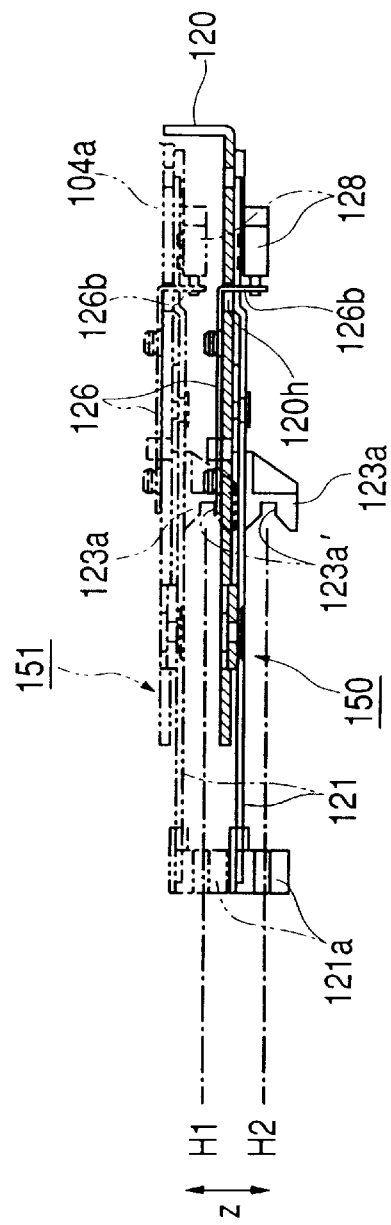

DISK DEVICE HAVING DISK TRANSFERRING MECHANISM CAPABLE OF SHORTENING DISK REPLACEMENT TIME

BACKGROUND OF THE INVENTION

1. Field of the Invention

This invention relates to a disk device for recording or reproducing information to or from a disk such as a CD (a compact disk) or a DVD (a digital versatile disk or a digital video disk) or the like, and more particularly, a disk device in which the disks are newly inserted and each of the disks can be driven.

2. Description of the Related Art

FIGS. 41A–41F are illustrative views showing a replacement work for disks in the prior art disk device.

In the prior art disk device, there was present a system in which although a disk insertion slot and a disk ejection slot were the same to each other, a subsequent disk could be inserted while a preceding disk was being driven and the disks could be replaced to each other only through a one-hand operation, for example.

As shown in FIGS. 41A–41F, as positions of the disk 50 (50-1 and 50-2) within such a disk device as described above, a disk inserting/ejecting position 52, a disk driving position 51 and a second driving position 53 above and below the disk inserting/ejecting position 52 are set.

Reference numeral 54 denotes a driving unit, wherein the disk 50 is mounted on a turntable (not shown) of the driving unit 54 and the disk 50 is driven under a state in which the disk 50 is clamped against the turntable by a clamp member 55. In addition, the insertion slot 56 for use in inserting the disk 50 is arranged at a front panel (not shown) of the disk device in correspondence with the disk inserting/ejecting position 52. In addition, reference numeral 57 denotes a supporting means having two upper and lower supporting positions 57a, 57b, wherein the disk transferred through the insertion slot 56 and the disk left in the disk device are temporarily supported.

Then, when the next disk 50-2 is inserted into the insertion slot 56 (FIG. 41B) under a state in which the disk 50-1 is being reproduced at the first driving position 51, for example, (FIG. 41A), a sensor not shown detects this disk 50-2 and the reproducing operation of the disk 50-1 is stopped in response to this detected signal.

Then, the driving unit 54 descends down to the second driving position 53 (so as to perform an unclamping operation) (FIG. 41B). Further, when the inserted disk 50-2 is fed into the supporting position 57b of the supporting means 57 and reaches up to the inserting/ejecting position 52 (FIG. 41C), the supporting means 57 supporting the disk 50-1 placed at the first driving position 51 and the disk 50-2 placed at the inserting/ejecting position 52 descends (FIG. 41C) and its descending operation is stopped at a position where the disk 50-2 placed at the inserting/ejecting position 52 reaches the second driving position 53 (FIG. 41D).

Under this operation, the disk 50-1 placed at the first driving position 51 comes to the inserting/ejecting position 52 and the disk 50-2 is ejected (FIG. 41E). Then, the disk 50-2 placed at the second driving position 53 is clamped by the clamp member 55 against the driving unit 54 (a clamping operation) and a reproducing operation of the disk 50-2, for example, is carried out.

However, the prior art disk device has been constructed such that when the disk 50-1 being driven was replaced with a next disk 50-2, the disk 50-2 was temporarily supported by the supporting means 57 and the supporting means 57 was descended down until the disk 50-2 reaches the driving position 53, so that it took much time for descending the supporting means 57 and the replacement work needed much time.

SUMMARY OF THE INVENTION

It is an object of the present invention to provide a disk device capable of shortening a disk replacement time.

As a first apparatus for solving the above described problem, there is provided a disk device comprising one insertion/ejection slot for inserting or ejecting a disk, a transferring means for transferring the disk inserted into the insertion/ejection slot to a position where it can be driven, and a driving unit ascended or descended in a direction crossing at a right angle with a disk surface of the disk transferred to the position where it can be driven and for driving the disk while mounting it thereon, wherein a first driving position and a second driving position where the disk is driven are set at different positions along the ascending or descending direction of the driving unit, the transferring means has a distributing mechanism for selectively changing over a transferring direction of the disk to either the first driving position or the second driving position, and when a next disk is inserted into the insertion/ejection slot under a state in which the disk is present at one of the driving positions of either the first driving means or the second driving position, the next disk inserted is transferred to the other driving position where no disk is present, the disk already present is ejected out of the insertion/ejection slot, resulting in that the next disk is driven by the driving unit.

As a second apparatus, there are provided one insertion/ejection slot for use in inserting or ejecting a disk, a transferring means for transferring the disk inserted into the insertion/ejection slot and a driving unit which can ascend or descend in a direction crossing at a right angle with a surface of the disk, each of a first driving position and a second driving position is set at different positions in the direction crossing at a right angle, the transferring means has a distributing mechanism for selectively changing over a transferring direction of the inserted disk to either the first driving position or the second driving position, the disk transferred to either the first driving position or the second driving position by the transferring means is installed by the driving unit ascended or descended in correspondence with the disk so as to drive the disk.

Further, as a third apparatus for solving the problem above, there is provided a system in which when a new desk is inserted from the insertion/ejection slot, the disk is transferred by the transferring means to a vacant position in either the first driving position or the second driving position, the disk already transferred into the disk device is transferred in reverse through the transferring passage of the disk into the disk device and carried out to the insertion/ejection slot.

Further, as a fourth apparatus for solving the problem above, the transferring means has a transferring roller and a pressing member, the disk is held between the transferring roller and the pressing member and the transferring roller is rotated.

Further, as a fifth apparatus for solving the problem above, the distributing mechanism has two opposed slant surfaces which can be selectively changed over against the insertion/ejection slot, the extremity of the disk inserted from the insertion/ejection slot is abutted against one slant surface and moved along the slant passage, thereby the transferring direction of the disk is changed over toward the first driving position and further abutted against the other slant surface to be changed over to the second driving position.

Further, as a sixth apparatus for solving the problem above, the distributing mechanism has a distributing plate turned in such a direction as one crossing at a right angle with the surface of the disk, an opposing surface against the insertion/ejection slot at the first rotating position of the distributing plate is applied as one slant surface and the opposing surface at the second rotating position is applied as the other slant surface.

BRIEF DESCRIPTION OF THE DRAWINGS

FIG. 16 is a top plan view for showing a damper member in the disk device of the preferred embodiment of the present invention.

FIG. 17 is a front elevational view for showing a damper member of the disk device of the preferred embodiment of the present invention.

FIG. 27 is a top plan view with a partial section related to the disk device of the preferred embodiment of the present invention for showing a state in which a transfer roller, a rotating shaft, a pressing member and a distribution plate are combined to each other.

FIG. 28 is a front elevational view related to the disk device of the preferred embodiment of the present invention for showing a state in which a transfer roller, a rotating shaft, a pressing member and a distribution plate are combined to each other.

FIG. 32 is a front elevational view for showing a lower side guide means of the disk device in the preferred embodiment of the present invention.

FIG. 33 is a partial sectional right side elevational view of the lower side guide shown in FIG. 31.

PREFERRED EMBODIMENTS OF THE INVENTION

Referring now to FIGS. 1 to 35, the disk device 100 of the preferred embodiment of the present invention will be described as follows.

Figure 1:
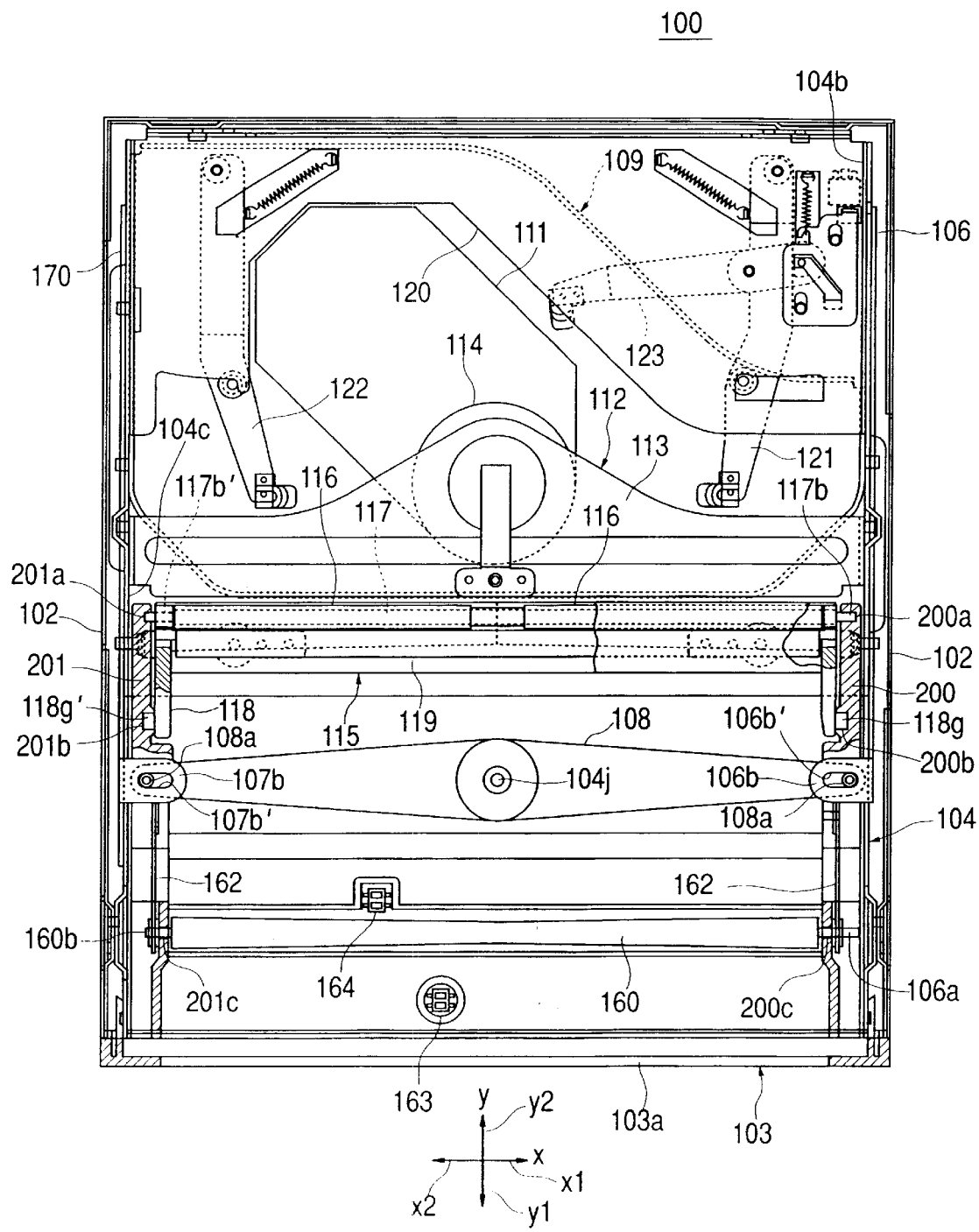
FIG. 1 is a top plan view with a partial section for showing a disk device of the preferred embodiment of the present invention.
Figure 2:
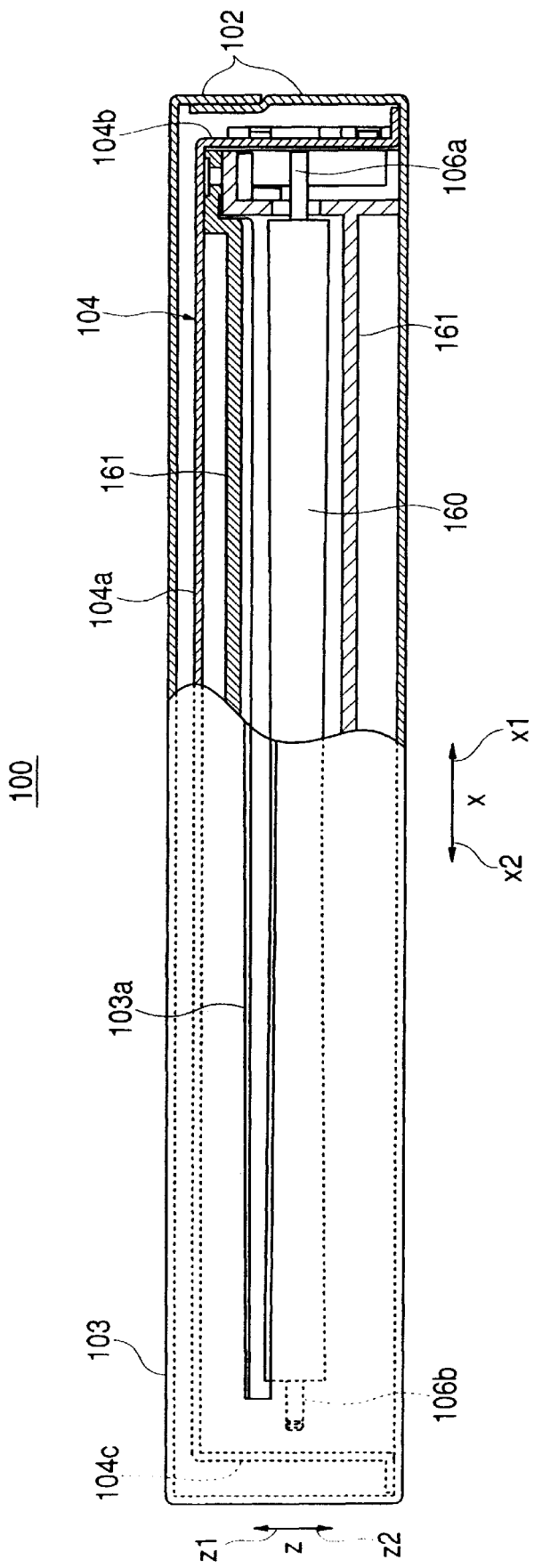
FIG. 2 is a front elevational view with a partial section for showing the disk device of the preferred embodiment of the present invention.
Figure 3:
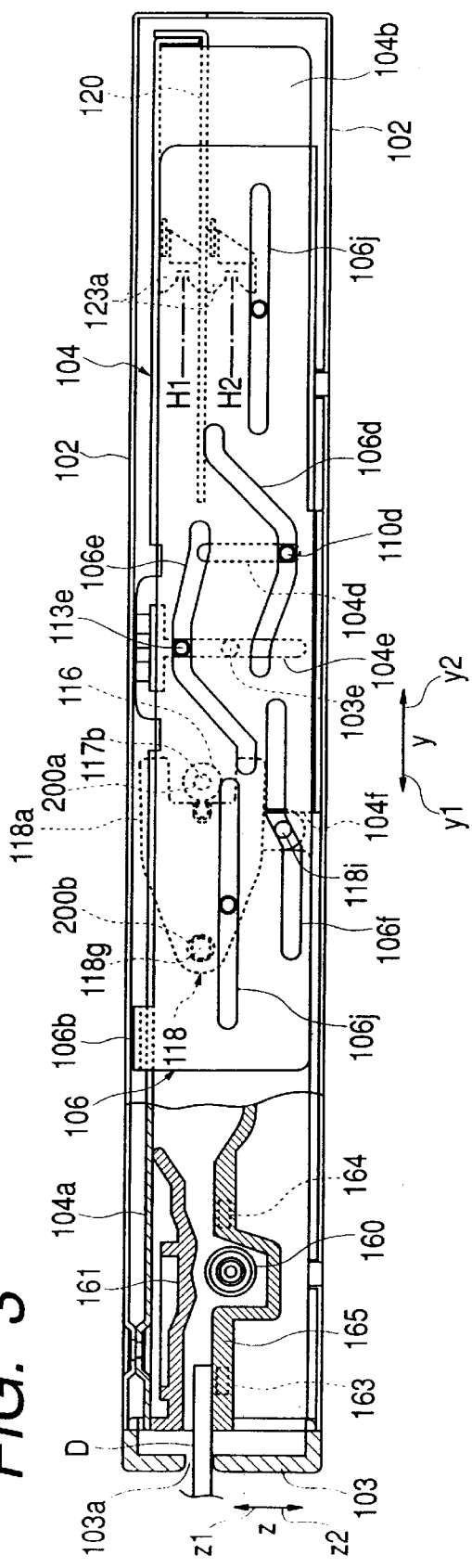
FIG. 3 is a right side elevational view with a partial section of the device shown in FIG. 1.
Figure 4:
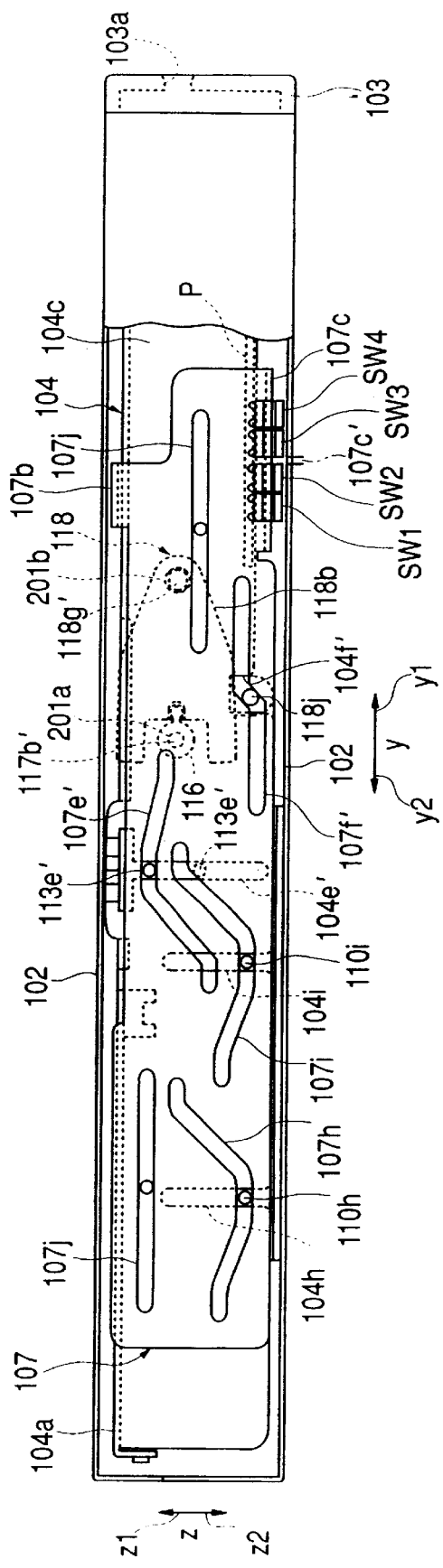
FIG. 4 is a left side elevational view of the device shown in FIG. 1.
Figure 5:
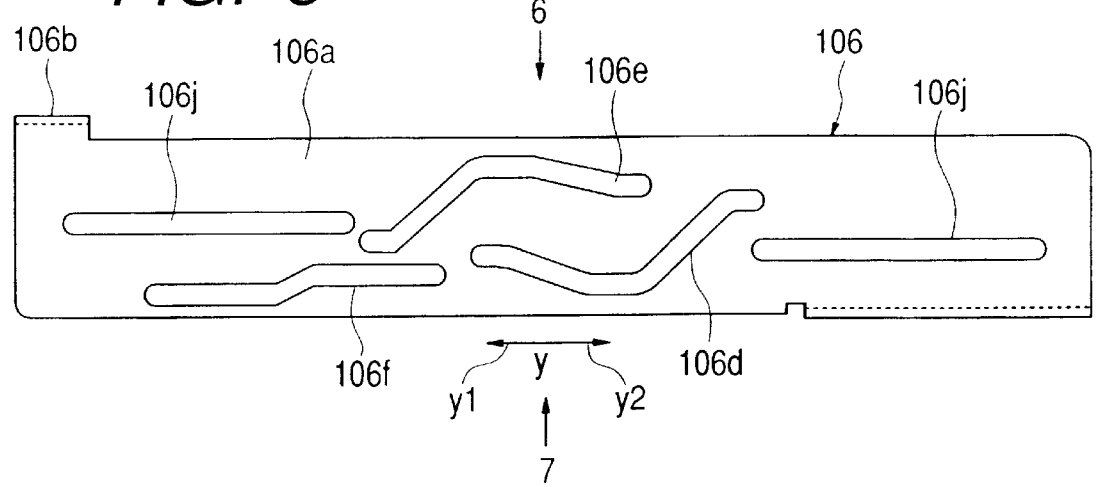
FIG. 5 is a top plan view for showing a moving member in the disk device of the preferred embodiment of the present invention.
Figure 6:
FIG. 6 is a view taken from a direction VI of FIG. 5.
Figure 7:
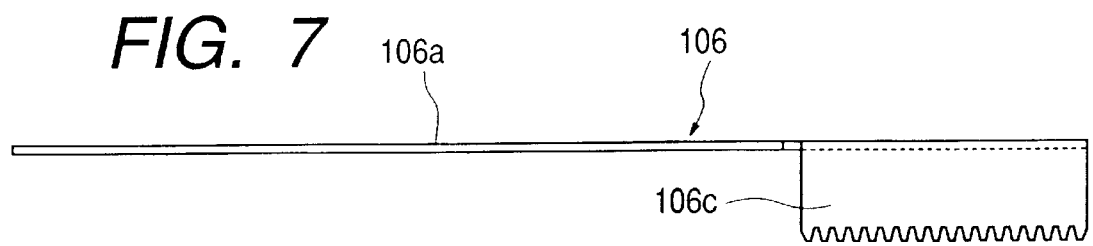
FIG. 7 is a view taken from a direction VII of FIG. 5.
Figure 8:
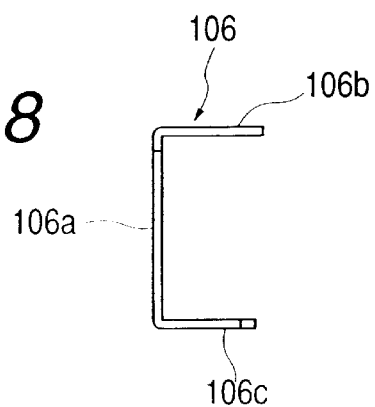
FIG. 8 is a right side elevational view of the moving member shown in FIG. 5.
Figure 9:
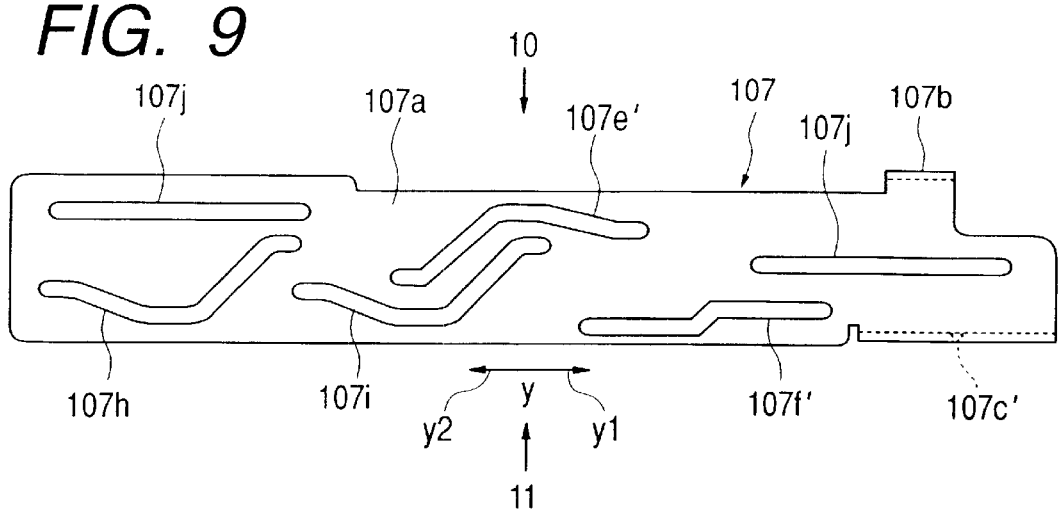
FIG. 9 is a top plan view for showing a moving member in accordance with the disk device of the preferred embodiment of the present invention.
Figure 10:
FIG. 10 is a view taken from a direction X—X of FIG. 9.
Figure 11:
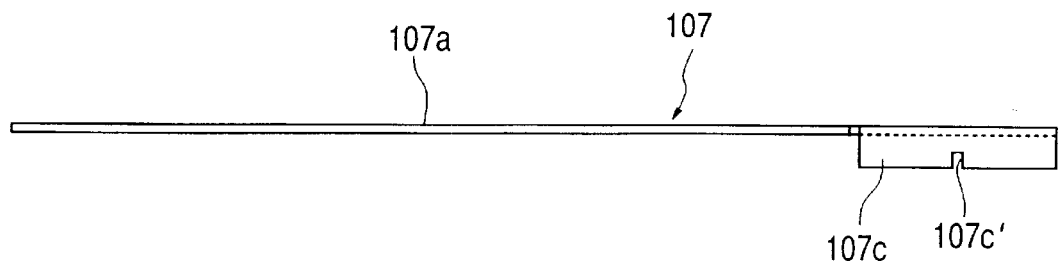
FIG. 11 is a view taken from a direction XI—XI of FIG. 9.
Figure 12:
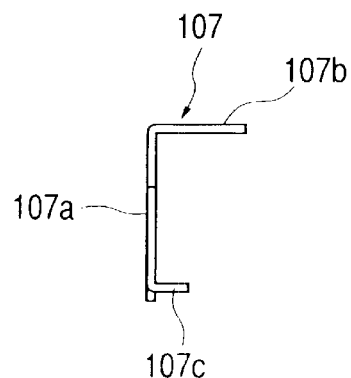
FIG. 12 is a right side elevational view of the moving member shown in FIG. 9.

FIG. 1 is a top plan view with a partial section for showing a disk device of the preferred embodiment of the present invention. FIG. 2 is a front elevational view with a partial section for showing the disk device. FIG. 3 is a right side elevational view with a partial section of FIG. 1. FIG. 4 is a left side elevational view of FIG. 1. FIG. 5 is a top plan view for showing a moving member 106. FIG. 6 is a view taken from a direction 6 of FIG. 5. FIG. 7 is a view taken from a direction 7 of FIG. 5. FIG. 8 is a right side elevational view of FIG. 5. FIG. 9 is a top plan view for showing a moving member 107. FIG. 10 is a view taken from a direction 10 of FIG. 9. FIG. 11 is a view taken from a direction 11 of FIG. 9. FIG. 12 is a right side elevational view of FIG. 9.

Figure 13:
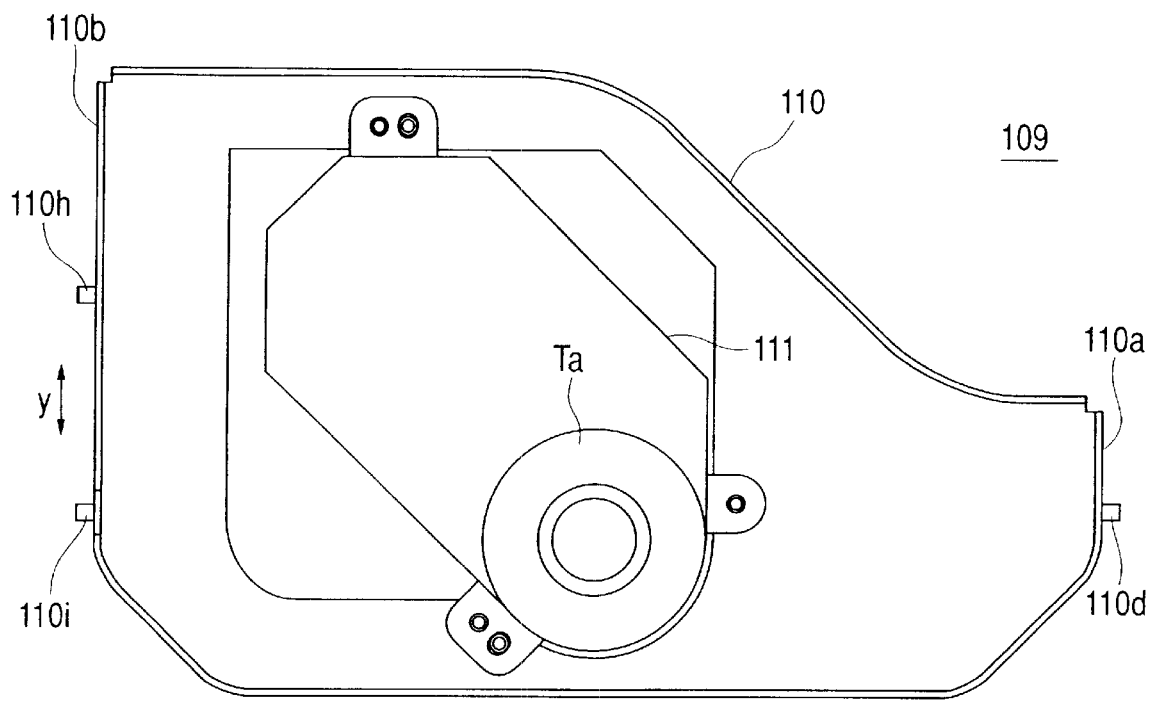
FIG. 13 is a top plan view for showing a driving unit in the disk device of the preferred embodiment of the present invention.
Figure 14:
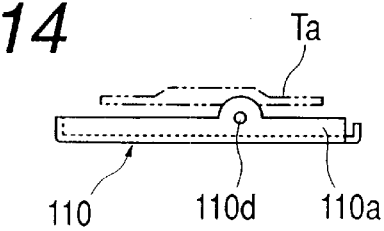
FIG. 14 is a right side elevational view of the driving unit shown in FIG. 13.
Figure 15:
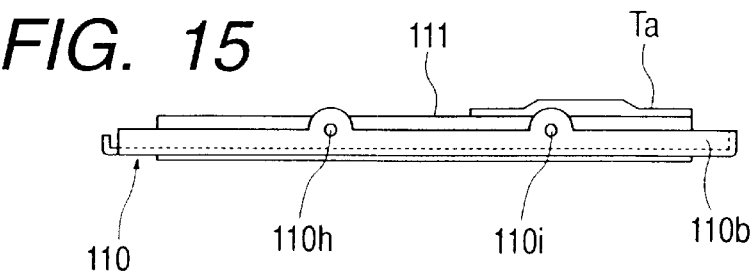
FIG. 15 is a left side elevational view of the driving unit shown in FIG. 13.
Figure 18:
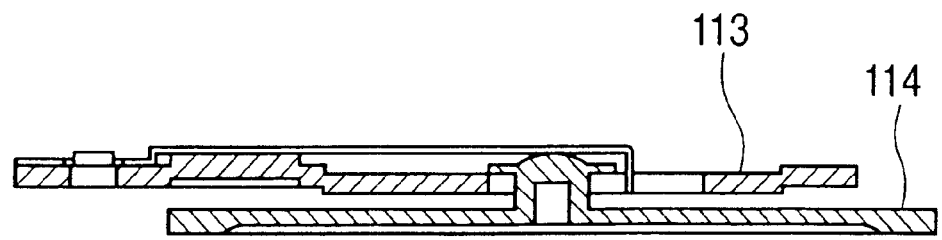
FIG. 18 is a sectional view taken along line XVIII—XVIII of FIG. 16.
Figure 19:
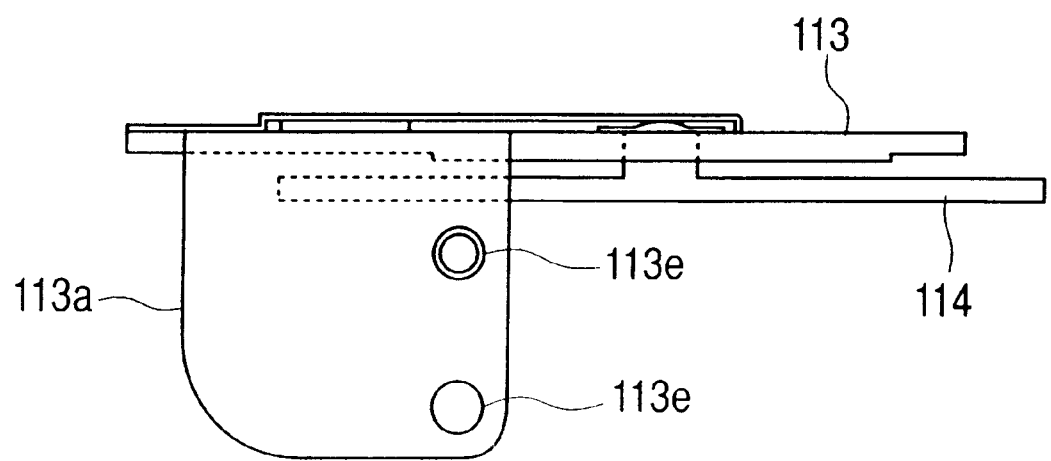
FIG. 19 is a right enlarged side elevational view of the damper member shown in FIG. 16.
Figure 20:
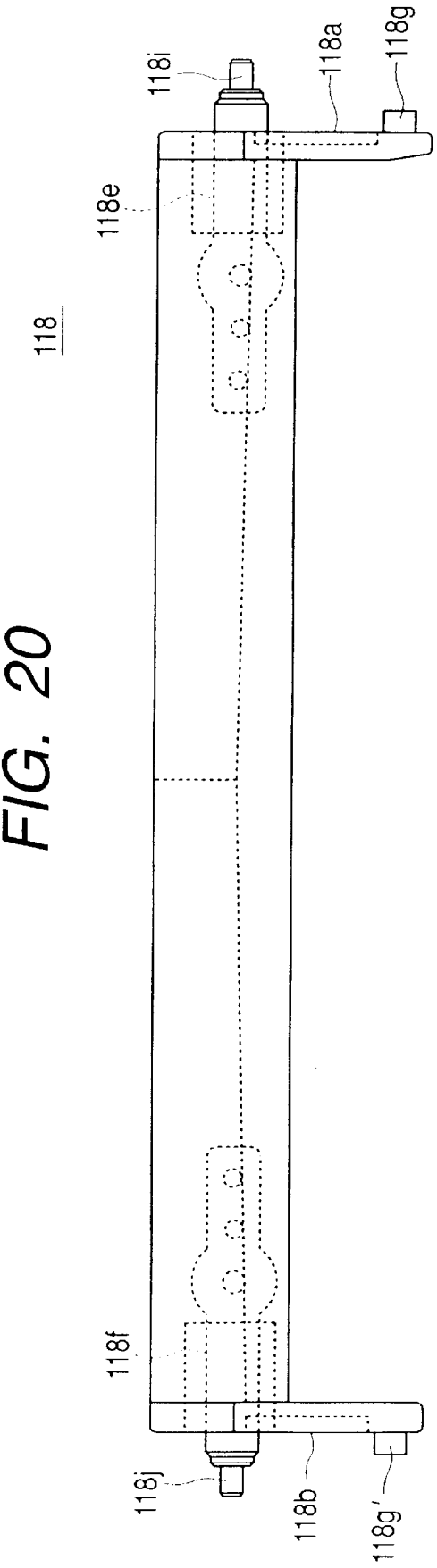
FIG. 20 is a top plan view for showing a pressing member of the disk device in the preferred embodiment of the present invention.
Figure 21:
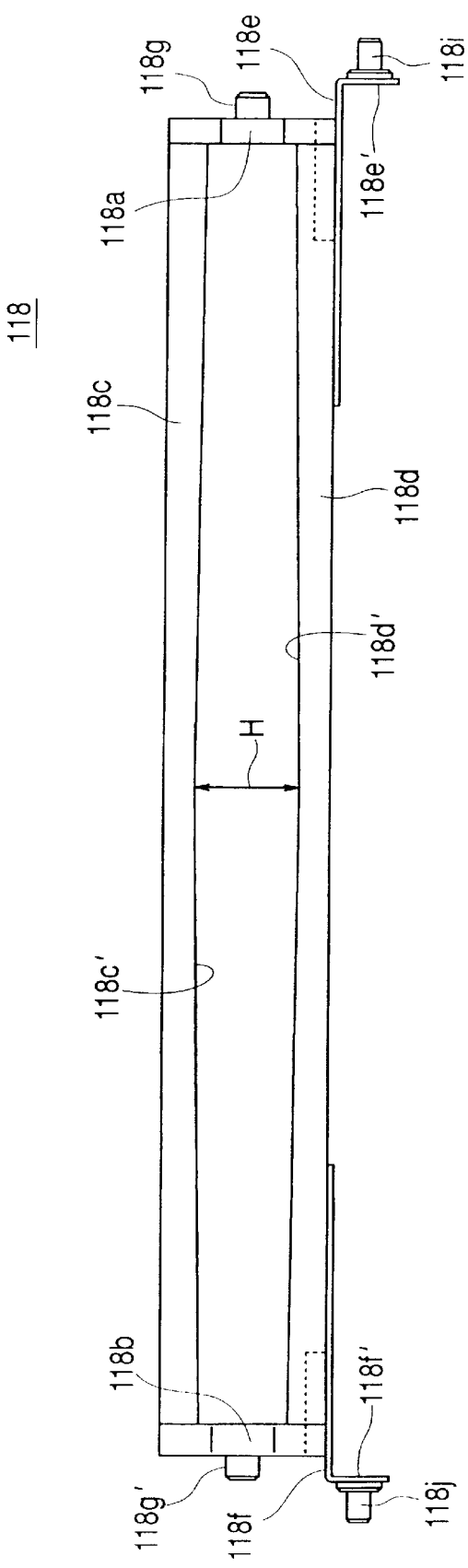
FIG. 21 is a front elevational view for showing a pressing member of the disk device in the preferred embodiment of the present invention.
Figure 22:
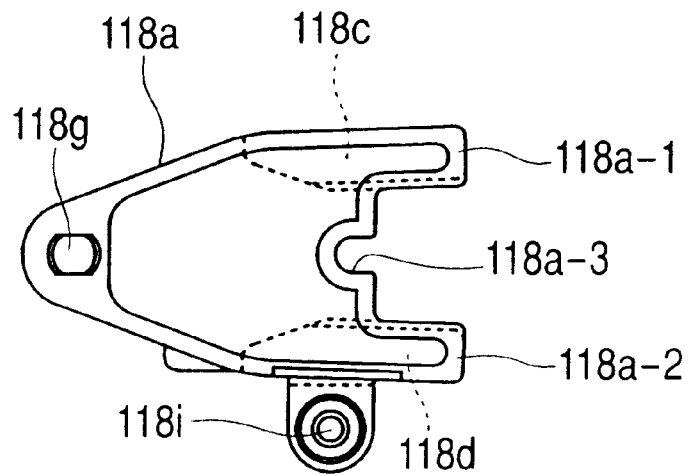
FIG. 22 is a right side elevational view of the pressing member shown in FIG. 20.
Figure 23:
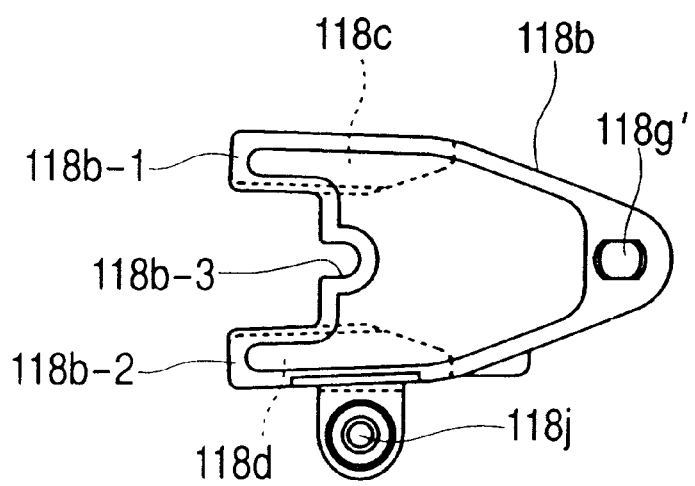
FIG. 23 is a left side elevational view of the pressing member shown in FIG. 20.

FIG. 13 is a top plan view for showing a driving unit 109. FIG. 14 is a right side elevational view of FIG. 13. FIG. 15 is a left side elevational view of FIG. 13. FIG. 16 is a top plan view for showing a damper member 112. FIG. 17 is a front elevational view for showing a damper member 112 of the disk device. FIG. 18 is a sectional view taken along line 18—18 of FIG. 16. FIG. 19 is a right enlarged side elevational view of FIG. 16. FIG. 20 is a top plan view for showing a pressing member 118. FIG. 21 is a front elevational view for showing a pressing member 118 of the disk device. FIG. 22 is a right side elevational view of FIG. 20. FIG. 23 is a left side elevational view of FIG. 20.

Figure 24:
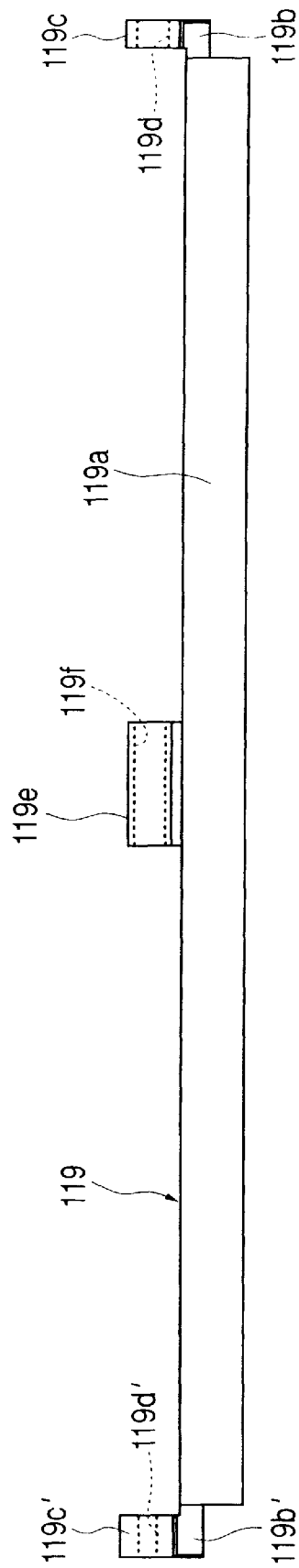
FIG. 24 is a top plan view for showing a distributing plate of a disk device in the preferred embodiment of the present invention.
Figure 26:
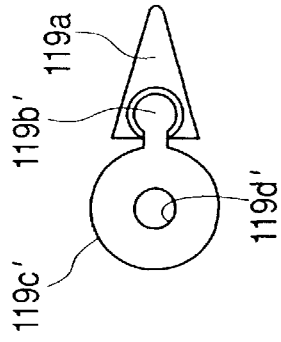
FIG. 26 is a left side elevational view of the distributing plate shown in FIG. 24.
Figure 25:
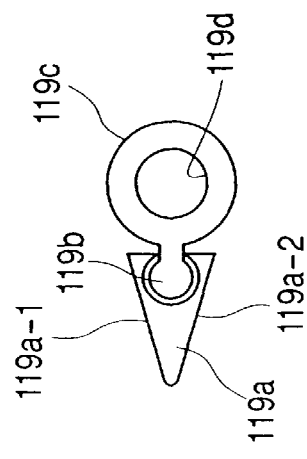
FIG. 25 is a right side elevational view of the distributing plate shown in FIG. 24.
Figure 29:
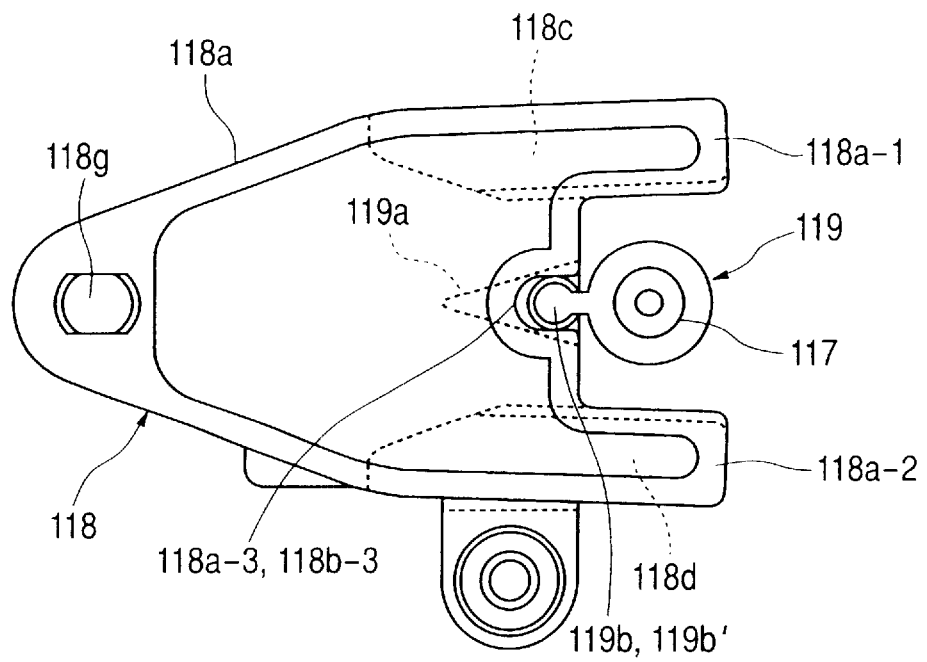
FIG. 29 is a right side elevational view of the components shown in FIG. 27.
Figure 30:
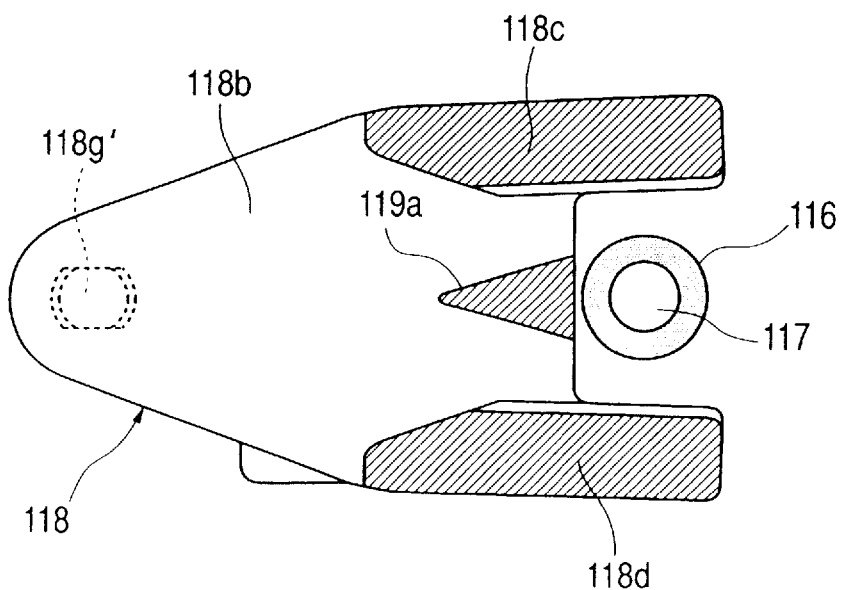
FIG. 30 is a sectional view taken along line XXX—XXX in FIG. 28.

FIG. 24 is a top plan view for showing a distributing plate 119. FIG. 25 is a right side elevational view of FIG. 24. FIG. 26 is a left side elevational view of FIG. 24. FIG. 27 is a top plan view with a partial section for showing a state in which a transfer roller 116, a rotating shaft 117, a pressing member 118 and a distribution plate 119 are combined to each other. FIG. 28 is a front elevational view related to the disk device. FIG. 29 is a right side elevational view FIG. 27. FIG. 30 is a sectional view taken along line 30—30 in FIG. 28.

Figure 31:
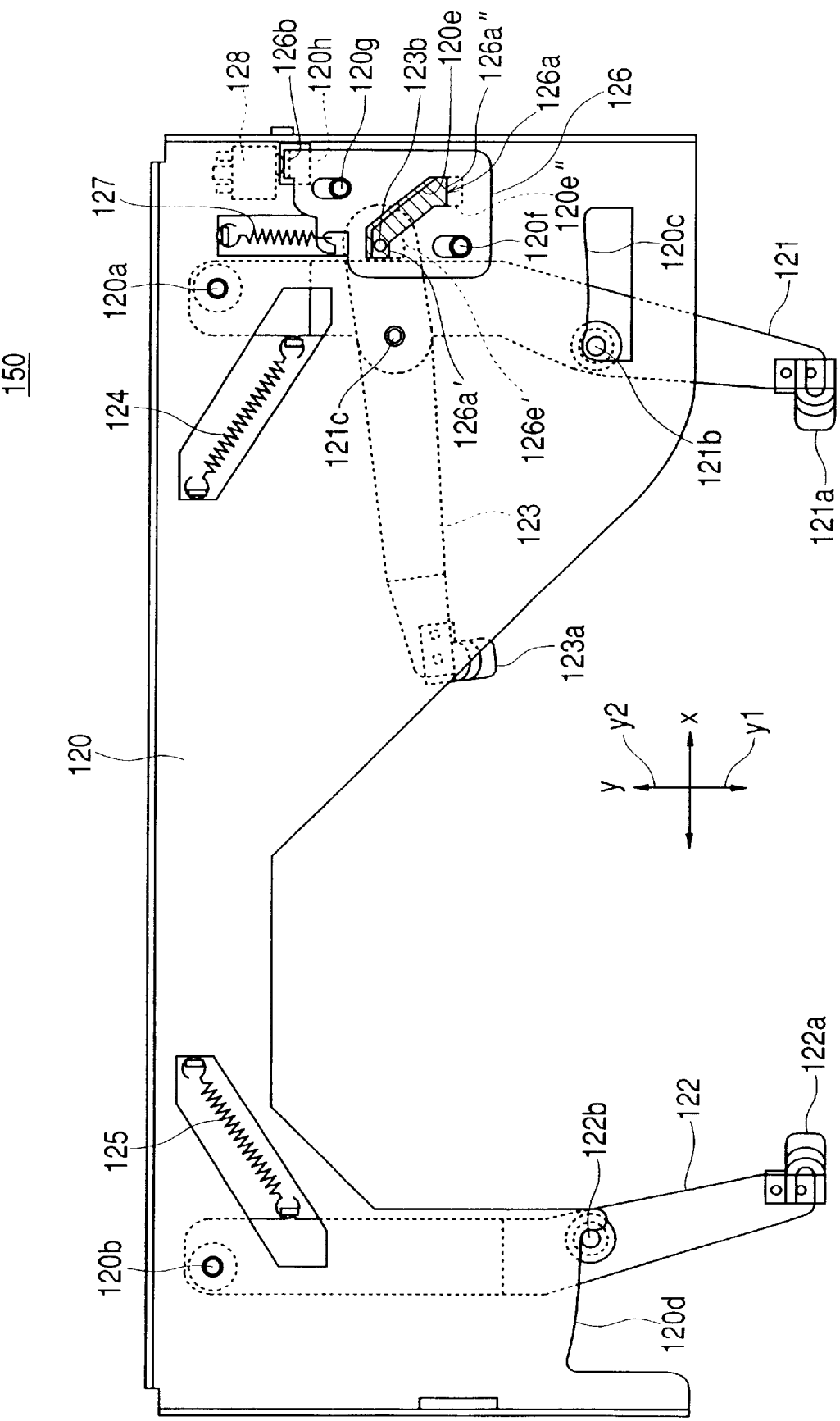
FIG. 31 is a top plan view for showing a lower side guide means of the disk device in the embodiment of the present invention.
Figure 34:
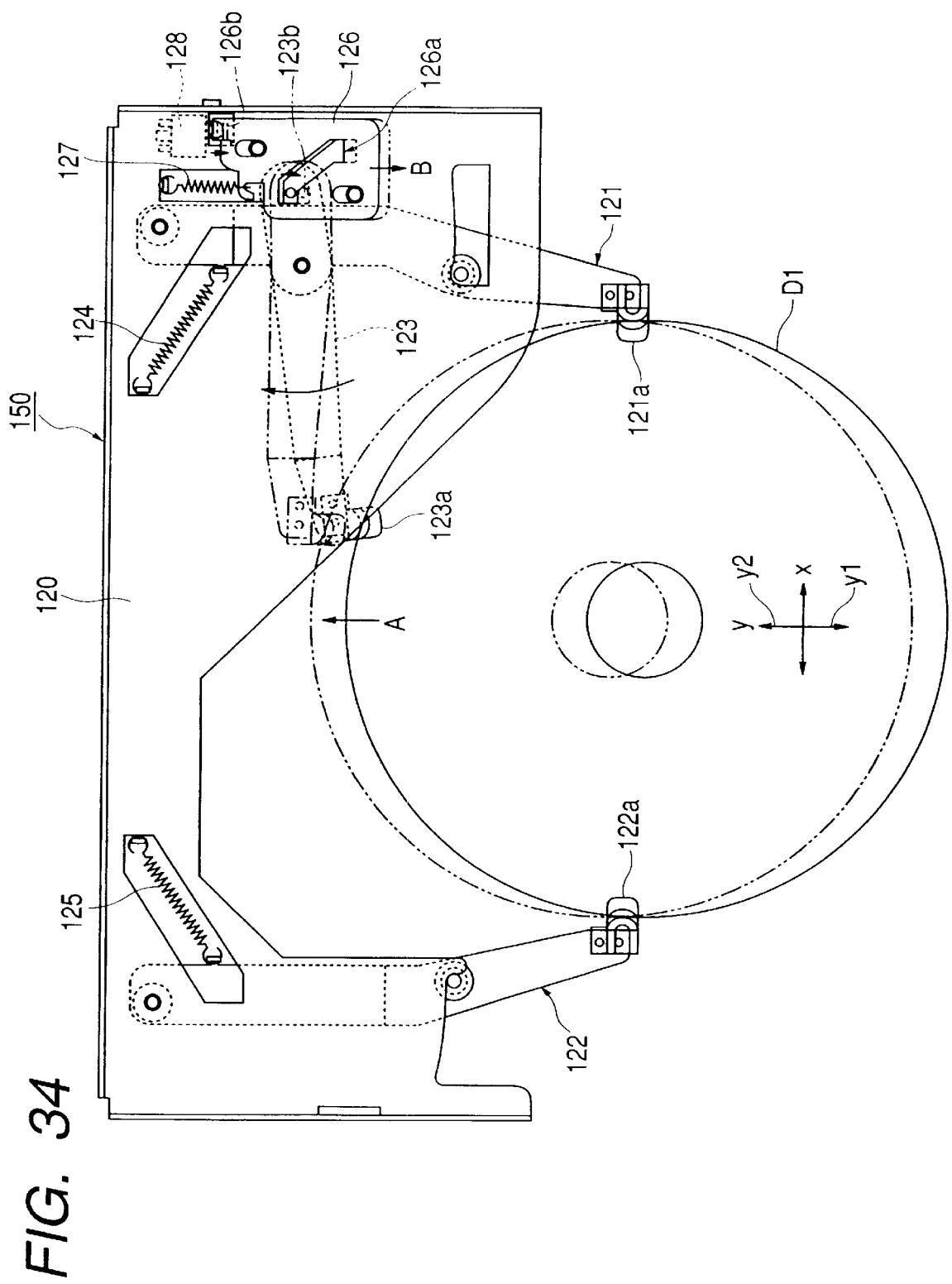
FIG. 34 is an illustrative view related to the disk device of the preferred embodiment of the present invention for showing an operation of the lower side guide means.
Figure 35:
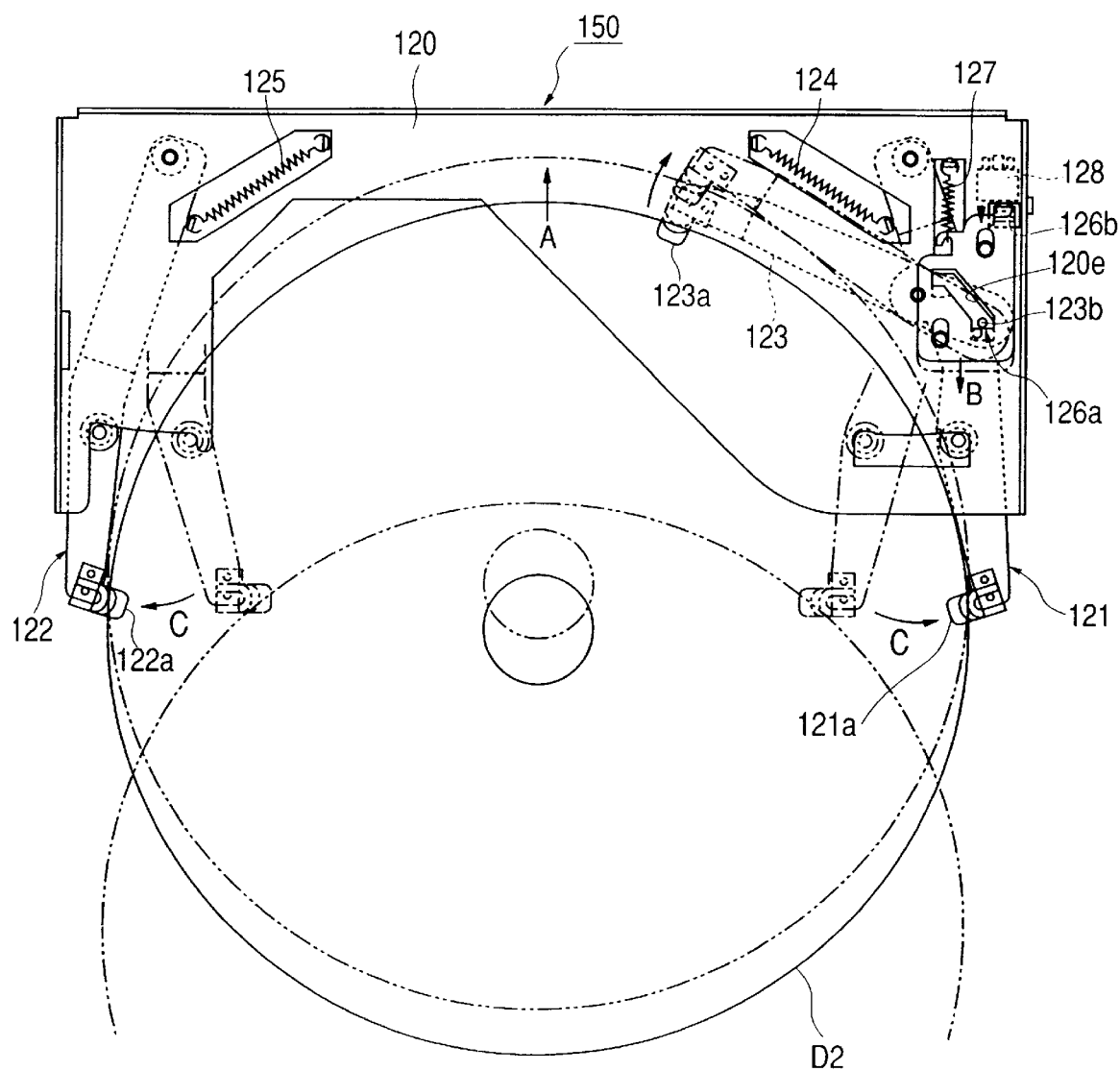
FIG. 35 is an illustrative view related to the disk device of the preferred embodiment of the present invention for showing an operation of the lower side guide means.

FIG. 31 is a top plan view for showing a lower side guide means 150. FIG. 32 is a front elevational view. FIG. 33 is a right side elevational view with a partial section of FIG. 31. FIG. 34 is an illustrative view for showing an operation of the lower side guide means 150. FIG. 35 is an illustrative view for showing an operation of the lower side guide means 150.

The disk device 100 shown in FIGS. 1 to 4 is provided with an outer case 102 formed by a metallic plate, and a front panel 103 arranged at the front side is formed with an insertion/ejection slot 103a. That is, this disk device 100 is a so-called slot-in type where inserting/ejecting of a disk D is performed through the insertion/ejection slot 103a.

An inner case 104 is arranged within the outer case 102. The inner case 104 is formed by a metallic plate, is constructed to have a top plate 104a, side plates 104b, 104c (refer to FIG. 2) formed to be opposite to each other while being bent downwardly from both sides of the top plate 104a in a direction (x), and a rotating shaft 104j is installed at the upper surface of the top plate 104a (refer to FIG. 1).

As shown in FIG. 3, the side plate 104b is formed with a guide groove 104d, a U-shaped groove 104e cut in a form of U-shape and a recessed groove 104f in a height direction (a direction z), respectively. Further, as shown in FIG. 4, the side plate 104c is formed with U-shaped grooves 104h, 104i, 104e' and a recessed groove 104f', respectively, in a height direction.

Further, each of the U-shaped groove 104e and the recessed groove 104f formed at the side plate 104b, and the U-shaped groove 104e' and the recessed groove 104f' formed in the side plate 104c are arranged in symmetrical at both sides. Then, each of the moving members 106, 107 is arranged at outer wall surfaces of these side plates 104b, 104c in such a way that the moving members can be slid in a direction of (y), respectively.

The moving member 106 is composed of a metallic plate, and as shown in FIGS. 5 to 8, it has a substantial rectangular-shaped plate 106a, a driving transmission segment 106b formed by bending a part of a side y1 (a side at the front panel) of the plate 106a, and a driving segment 106c formed by bending a part of the y2 side in the same direction as that of the driving transmission segment 106b. A longitudinal hole 106b' having a long diameter in the direction (x) is formed to pass through the driving transmission segment 106b.

In addition, the extremity of the driving segment 106c is formed with a rack. Further, the plate 106a is formed with two guide grooves 106j, 106j in the direction (y) and each of the cam grooves 106d, 106e, 106f having a predetermined cam configuration, respectively.

The moving member 107 is composed of a metallic plate, and as shown in FIGS. 9 to 12, it has a substantial rectangular-shaped plate 107a, a driving transmission segment 107b formed by bending a part of the y1 side (the side of the front panel 103) of the plate 107a, and a bent piece 107c formed by bending a part of the plate 107a so as to be oppositely faced against the driving transmission segment 107b.

A longitudinal hole 107b' of long diameter is passed and formed through the driving transmission segment 107b in the direction of (x), and a slit 107c' is cut and formed at the central part of the bending piece 107c. Further, the plate 107a is formed with two guide grooves 107j, 107j in the direction (y) and each of the cam grooves 107e', 107f', 107b and 107i having a predetermined cam configuration, respectively.

These moving members 106, 107 are slidably supported on the outer wall surfaces of the side plates 104b, 104c arranged at the inner case 104 (refer to FIGS. 3 and 4) along each of the guide grooves 106j, 106j and guide grooves 107j, 107j in the direction (y), respectively. Further, as shown in FIGS. 3 and 4, although each of the cam grooves 106e, 106f formed at the moving member 106, and the cam grooves 107e', 107f' formed at the moving member 107 has the same shape to each other, they are arranged to be opposite in the direction (y) in a forward or rearward orientation. The cam groove 196d formed at the moving member 106 and the cam grooves 107b and 107i formed at the moving member 107 have the same shape to each other and they are arranged to be opposite in direction in a forward or rearward orientation.

To the rack of the driving segment 106c of the moving member 106 is engaged a driving gear rotationally driven by a driving motor arranged in the disk device 100 (both of them are not shown) and the moving member 106 is driven in the forward or rearward direction (y).

Further, as shown in FIG. 4, four transmission type optical sensor switches SW1, SW2, SW3 and SW4 are arranged side by side in a predetermined space at a lower part of the front panel 103 of the inner case 104 and inside the moving member 107, and the bent piece 107c of the moving member 107 is inserted in its non-contacted state into a clearance of optical transmission section of each of the optical sensing switches SW1 to SW4. Further, each of the optical sensor switches SW1 to SW4 is set such that the switch is turned OFF when the optical transmission segment is shut off.

In turn, as shown in FIG. 1, an arm-like arm member 108 is arranged on the top plate 104a of the inner case 104 and its central part is rotatably supported at the rotating shaft 104j. Further, each of the driving pins 108a, 108a is arranged at both ends of the arm member 108 in an upward orientation, respectively.

These driving pins 108a, 108a of the arm member 108 are rotatably fitted to longitudinal holes 106b', 107b' formed at the moving members 106, 107 and also slidably fitted along the long diameter direction of the longitudinal hole. When the moving member 106 is driven by the driving motor in the direction (y), the driving transmission segment 106b of the moving member 106 turns the arm member 108, transmits driving force to the driving transmission segment 107b of the moving member 107 arranged in opposition to the driving transmission segment 106b and the moving member 107 can be driven to slide in the direction (y). As apparent from the figure, the moving members 106, 107 are driven while their directions are in opposite direction.

As shown in FIGS. 13 to 15, the driving unit 109 is constructed to have a chassis 110 and a recording/reproducing segment 111 mounted on the chassis 110, attached to and fixed to it. The chassis 110 is formed by bending a metallic plate and provided with side plates 110a, 10b oppositely faced in parallel to each other. The side plate 10b is formed to be longer at its length in the direction (y) than that of the side plate 110a and moving pins 110b, 110i are installed at the outer wall surface of the side plate 110b. Further, a moving pin 110d is installed at the outer wall surface of the side plate 11a.

In addition, the recording/reproducing segment 111 is provided with a spindle motor (not shown) and a turntable Ta is fixed to the rotating shaft of the spindle motor. Further, a pick-up (not shown) is installed at the recording/reproducing segment 111 so as to be oppositely faced against the recording/reproducing surface of the disk D and either the recording or reproducing operation can be performed against the disk.

As shown in FIGS. 16 to 19, the clamper member 112 is constructed to have a clamp chassis 113 and a clamper 114 of longitudinal shape in the direction (x). The clamp chassis 113 is formed by bending a metallic plate and it has, at its both sides, side plates 113a, 113b oppositely arranged in parallel from each other. Each of the two moving pins 113e, 113e and 113e', 113e' is arranged side-by-side at the outer wall surfaces of the side plates 113a, 113b in the direction (z). In addition, the damper 114 is rotatably arranged at the central part of the clamp chassis 113.

Then, as shown in FIG. 3, the moving pin 110d arranged at the chassis 110 of the driving unit 109 is inserted into the guide groove 104d and also inserted into the cam groove 106d and the moving pin can move within these guide groove 104d and cam groove 106d. Similarly, as shown in FIG. 4, each of the driving pins 110h, 110i arranged at the chassis 110 is inserted into each of the U-shaped grooves 104h, 104i, and further inserted into each of the cam grooves 107h, 107i and it can be moved in these U-shaped grooves 104h, 104i and cam grooves 107h, 107i. In this way, the driving unit 109 is arranged in the inner case 104.

Further, as shown in FIG. 3, the moving pins 113e, 113e arranged at the clamp chassis 113 of the damper member 112 are inserted into the U-shaped groove 104e and at the same time, the upper side moving pin 113e is also inserted into the cam groove 106e and it can be moved in these U-shaped groove 104e and the cam groove 106e. Similarly, as shown in FIG. 4, the moving pins 113e', 113e' arranged at the clamp chassis 113 are inserted into the U-shaped groove 104e', the upper moving pin 113e' is also inserted into the cam groove 107e' and it can move in these U-shaped groove 104e' and the cam groove 107e'. In this way, the clamper member 112 is arranged within the inner case 104.

As shown in FIG. 1, the transferring means 115 is constituted to have transferring rollers 116, 116; a rotating shaft 117 having fine diameter shafts 117b, 117b at both ends; a transferring motor (not shown) rotationally driving the rotating shaft 117 and rotating the transferring roller 116 in either a clockwise direction or a counterclockwise direction; a pressing member 118; and a distributing plate 119.

As shown in FIGS. 20 to 23, the pressing member 118 is constituted to have substantial U-shaped side plates 118a, 118b oppositely faced to each other; upper and lower two pressing plates 118c, 118d arranged to bridge over the two side plates 118a, 118b; and supporting plates 118e, 118f each of which is attached to and fixed to the lower surface of the lower pressing plate 118d and protruded at both sides. The side plates 118a, 118b and the pressing plates 118c, 118d are made of resin and integrally molded by it.

The side plate 118a has a pair of arm segments 118a-1 and 118a-2 at one end, and the inner bottom surface of a notch held by each of the arm segments 18a-1 and 18a-2 is provided with a U-shaped recess 118a-3. In addition, a rotating shaft 118g is installed at the outer wall surface of the other end of the side plate 118a. Similarly, the side plate 118b is provided with the arm segments 118b-1 and 118b-2, a recess 118b-3 and a rotating shaft 118g'.

Then, the pressing plate 118c is arranged to bridge over each of the arms 118a-1 and 118b-1 of both side plates 118a, 118b, respectively. Similarly, the pressing plate 118d is arranged to bridge over each of the arms 118a-2 and 118b2 of both side plates 118a, 118b, respectively. That is, the two pressing plates 11c and 118d are arranged to be oppositely faced against to each other with a certain clearance. In addition, as shown in FIG. 21, each of opposing surfaces of each of the pressing plates 118c, 118d is formed with pressing surfaces 118c', 118d' which are gradual concave surfaces formed with its clearance H being made wide as it approaches the center part.

In addition, the supporting plates 118e, 118f are composed of a metallic plate having a spring characteristic and as shown in FIG. 21, the bent pieces 118e', 118f' bent into an L-shape are formed and each of the moving pins 118i, 118j is installed at the outer wall surfaces of these pieces. The extremity of each of the supporting plates 118e, 118f at the moving pins 118i, 118j can be resiliently displaced in a vertical direction as shown in FIG. 21.

As shown in FIGS. 24 to 26, the distributing plate 119 is integrally formed with resin and constituted to have a distributing segment 119a having a wedge-shaped section; engaging shafts 119b, 119b' formed to be protruded from both end surfaces of the distributing segment 119a; column-like supporting segments 119c, 119c' cooperatively connected to sides opposite to the distributing segment 119a against each of the engaging shafts 119b, 119b'; and a supporting segment 119e arranged at the central part of the distributing segment 119a on the coaxial sides of the supporting segments 119c, 119c'. In addition, the supporting segments 119c, 119e are coaxially formed with through holes 119d, 119f of large diameter, and the supporting segment 119c' is coaxially formed with a through hole 119d' of small diameter, respectively.

Then, as shown in FIGS. 27 to 30, each of the transferring rollers 116, 116 is arranged between the supporting segments 119e, 119c of the distributing member 119 and between the supporting segments 119e, 119c', a rotating shaft 117 is inserted through the through holes 119d, 119f of the supporting segments 119c, 119e and through the central part of each of the transferring rollers 116, 116, and the small diameter shaft 117b' is inserted through the through hole 119d' of the supporting segment 119c', thereby the transferring rollers 116, 116 are rotatably assembled to the distributing member 119.

As shown in FIGS. 1, 3 and 4, this assembly is arranged within the inner case 104 while each of the fine diameter shafts 117b and 117b' is rotatably fitted to round holes 200a, 201a of the supporting members 200, 201 arranged at both sides of the inner case 104. At this time, as shown in FIG. 3, the position of the transferring roller 116 in the direction (z) is assumed to be arranged between the first driving position H1 and the second driving position H2 (to be described later)

Further, the pressing plate 118c is pivotally supported in the round hole 200b formed at the supporting member 200, the moving pin 118i is inserted into the recess 104f of the side plate 104b and at the same time, it is also inserted into the cam groove 106f of the moving member 106, and the rotating shaft 118g' is pivotally supported at the round hole 201b formed at the supporting member 201, the moving pin 118i is inserted into the recess 104f' of the side plate 104c and also inserted into the cam groove 107f' of the moving member 107, thereby it is arranged in the inner case 104.

At this time, as shown in FIG. 29, each of the engaging shafts 119b, 119b' of the distributing member 119 is rotatably engaged with each of the recesses 118a-3, 118b-3 arranged at the side plates 118a, 118b of the pressing member 118, respectively.

The disk guide means comprises a lower guide means 150 constructed at a sub-chassis 120 (refer to FIGS. 1 and 3) attached to and fixed to the rear part of the inner case 104, and the upper guide means 151 constructed at the top plate 104a of the inner case 104 at the upper position of the sub-chassis 120.

As shown in FIGS. 31 to 33, the lower side guide means 150 is arranged at the lower surface side of the sub-chassis and is constructed to have guide arms 121, 122, 123 having arm-like segments of metallic plates. Then, the guide arms 121 and 122 are arranged at both sides of the sub-chassis 120 in the direction (x) so as to be oppositely faced to each other, and each of them is pivotally supported at one end to the rotating shafts 120a, 120b installed at the lower surface side of the sub-chassis 120 and rotatable there.

In addition, the resin disk guides 121a, 122a are integrally arranged at the other ends of the guide arms 121, 122. As shown in FIG. 32, these disk guides 121a, 122a are formed with U-shaped recess grooves 121a', 122a' so as to be oppositely faced to each other and further slant segments are formed to be expanded from the recess grooves 121a', 122a' toward the opening.

Further, each of the engaging shafts 121b, 122b is installed at an upper surface of each of the guide arms 121, 122 between the rotating shafts 120a, 120b and the disk guides 121a, 122a, respectively. In addition, a rotating shaft 121c is installed at an upper surface between the rotating shaft 120a and the engaging shaft 121b.

The guide arms 121, 122 are resiliently biased by coil springs 124, 125 toward opposing sides (inside), respectively. Inner positions of the guide arms 121, 122 are restricted to each other by abutting each of the engaging shafts 121b, 122b against the inner edges of restricting grooves 120c, 120d recessed and formed at the sub-chassis 120, respectively.

In turn, the guide arm 123 has at its extremity the disk guide section 123a having the recess groove 123a' with the same shape as that of the guide arms 121, 122. A moving pin 123b is installed at the upper surface of the end opposite to the disk guide 123a.

The guide arm 123 constituted as described above is pivotally supported at the rotating shaft 121c arranged at the guide arm 121 between the disk guide 123a and the moving pin 123b. In addition, the moving pin 123b of the guide arm 123 is movably inserted into the guide groove 120e formed at the sub-chassis 120 in a rightward inclined shape. Both ends of the guide groove 120e are formed with each of the free fitting segments 120e', 120e" in a vertical direction to which the moving pin 123b can freely fit.

As shown in FIGS. 32 and 33, the disk guide segments 121a, 122a, 123a arranged at each of the guide arms 121, 122, 123 described above are installed at the same height in the height direction (the direction (z)) of the disk device 100. Then, the recess grooves 121a' to 123a' formed at each of the disk guide segments 121a to 123a are also arranged at the same height, wherein the outer circumferential edge of the disk D (D1 or D2) is held from outside and the disk D is held by the guide arms 121 to 123. In this case, the holding position in the direction (z) of the disk D guided by the lower guide means 150 is applied as a second driving position H2 and the position at the upper guide means 151 is applied as a first driving position H1 (refer to FIGS. 32 and 33).

In turn, the slide member 126 is slidably arranged at the upper surface of the sub-chassis 120 in the direction (y) along the pins 120f, 120g installed at the upper surface of the sub-chassis so as to cover the guide groove 120e shown in FIG. 31. In addition, the slide member 126 is resiliently biased by the coil spring 127 toward the y2 side.

In addition, the slide member 126 is provided with an engaging groove 126a (a slant line part) formed at a substantial overlapped position on the guide groove 120e, and the pressing segment 126b formed by bending a part of the slide member 126 into an L-shape. A moving pin 123b of the guide arm 123 inserted into the guide groove 120e and protruded is inserted into the engaging groove 126a, and both ends of the engaging groove 126a are formed with each of restricting surfaces 126a', 126a" restricting forward motion (the direction y1) of the moving pin 123b, respectively. Further, the pressing segment 126b is inserted into the through hole 120h formed at the sub-chassis 120 and protruded at the lower surface (refer to FIG. 33).

Further, a sensing switch 128 is attached to and fixed to the lower surface of the sub-chassis 120 so as to oppositely face against the pressing segment 126b. Under the state shown in FIGS. 31 to 33, the pressing segment 126b presses the lever of the sensing switch to cause the switch to be turned ON.

In FIGS. 34 and 35 is shown a state in which each of a small diameter-type disk D (D1) having an outer diameter of 8 cm, and a disk D (D2) having an outer diameter of 2 cm, for example, is guided and held by the guide arms 121 to 123 of the lower guide means 150.

At first, when the small-diameter type disk D1 is sent by the transferring means 115 (refer to FIG. 1) from the forward (the side of the front panel 103) of the lower guide means 150, the disk D1 is transferred until it is abutted against the disk guide 123a while both sides of the disk D1 are being guided by the opposing disk guide segments 121a, 122a under a state shown in FIG. 31.

Then, as shown in FIG. 34, after the extremity of the disk D1 is abutted against the disk guide 123a of the guide arm 123, the disk guide 123a is further pressed in a direction A as seen in the figure, thereby the guide arm 123 is turned in a clockwise direction and the moving pin 123b in opposition to the disk guide 123a is abutted against the restricting surface 126a' (refer to FIG. 31) formed at the engaging groove 126a of the slide member 126 and it is pressed in the direction y1 in opposition to the resilient force of the coil spring 127. At this time, the slide member 126 is moved in the direction B as viewed in the figure, the pressing segment 126b is moved away from the sensing switch 128 and the sensing switch is turned OFF. In this way, it detects that the disk D1 is transferred completely to the lower guide means 150.

Then, when the disk D2 is fed from the forward part of the lower guide means 150 (the side of the front panel 103), the extremity of the disk D2 is abutted against the opposing disk guides 121a, 122a under a state shown in FIG. 31. Then, each of the guide arms 121, 122 is turned against the resilient force of the coil springs 124, 125 in the direction of arrow C as viewed in FIG. 35.

Concurrently, the guide arm 123 pivotally supported at the guide arm 121 is moved together with the guide arm 121 in the turning direction. At this time, the moving pin 123b arranged at the guide arm 123 is moved along the guide groove 120e formed at the sub-chassis 120 and positioned at the free fitting segment 120e" (refer to FIG. 31).

After this operation, the disk D2 is further fed to the deeper side while its both sides are being guided at the disk guide sections 121a, 122a. Then, as shown in FIG. 35, after the extremity of the disk D2 is abutted against the disk guide 123a, the disk guide 123a is further pressed in the direction A in the figure, thereby the moving pin 123b opposite to the disk guide 123a is abutted against the restricting surface 126a' (refer to FIG. 31) formed at the engaging groove 126a of the slide member 126 so as to depress it against the resilient force of the coil spring 127 in the direction y1.

At this time, the slide member 126 is moved in the direction B as viewed in the figure, the pressing segment 126b is moved away from the sensing switch 128 and the sensing switch is turned OFF. In this way, the fact that the disk D2 is completely transferred to the lower guide means 150 can be detected.

In this way, in the preferred embodiment of the present invention, the disk D2 of normal size (for example, either CD or DVD having an outer diameter of 12 cm) and a small diameter disk D1 (for example, CD having an inner diameter of 8 cm) can be easily held at the guide means. Operation for holding the disk D as described above is similarly applied to that of the upper guide means 151.

Next, the upper guide means 151 has the same configuration as that of the lower guide means 150 and as shown in FIGS. 32, 33, it is arranged at the top plate 104a and it is arranged to overlap on each of the component parts of the lower guide means 150 in the vertical direction in a predetermined clearance.

In order to avoid any overlapped description, a description about the upper guide means 151 will be eliminated. Each of the same component parts of the upper guide means 151 as that of the lower guide means 150 is denoted by the same reference symbols.

The feeding means is arranged near the front panel 103 of the disk device 100, and as shown in FIGS. 1 to 3, this is constituted to have a transferring roller 160, a pressing plate 161, a supporting base 165 and a transferring motor (not shown) for rotating the transferring roller 160 in either a clockwise direction or a counterclockwise direction. In addition, the transferring roller 160 is provided with rotating shafts 160a, 160b formed to be protruded from both end surfaces, and as shown in FIG. 1, each of the rotating shafts is rotatably pivoted in each of the holes 200c, 201c formed at the supporting members 200, 201.

The outer walls of the supporting members 200, 201 are provided with biasing members 162, 162 (refer to FIG. 1) of helical coil spring so as to resiliently bias the transferring roller 160 in an upward direction (the direction z1).

In addition, as shown in FIGS. 1 and 3, a supporting base 165 lower than the insertion/ejection slot 103a near the front panel 103 is provided with a reflection type photo-sensing switch 163 so as to be exposed upside. Further, a similar reflection type photo-sensing switch 164 is arranged at the opposite side of the photo-sensing switch 163 while the transferring roller 160 is being held thereat.

Operation of each of the members in the disk device 100 constructed as described above and a replacing operation for the disk D will be described as follows.

FIGS. 36 to 40 illustrate for illustrating a replacing operation of the disk.

In the preferred embodiment of the present invention, it is assumed that the case of using the disk D (D2) of normal size acting as a disk D will be described.

At first, the case in which the disk D2 (-1) is reproduced at the first driving position H1 (refer to FIGS. 32 and 33) in the upper side guide means 151 will be described.

Figure 36:
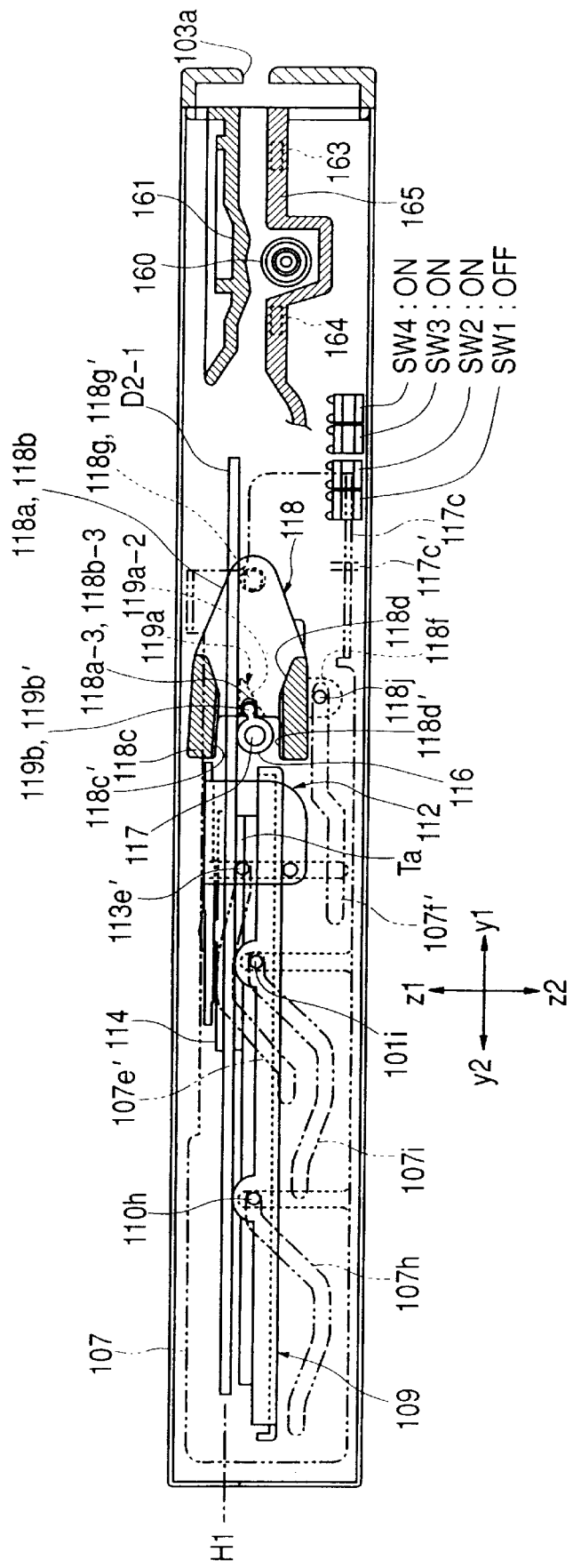
FIG. 36 is an illustrative view related to the disk device of the preferred embodiment of the present invention for illustrating a replacing operation for the disk.

In FIG. 36, the moving member 107 (106) is kept at a state in which it is moved most in the direction y2 (y1) and the driving unit 109 is placed at the most ascended upper position at the z1 side. In addition, the upper moving pin 113e' (113e) of the clamper member 112 is descended relatively at a slant segment in the direction y1 (y2) of the cam groove 107e' (106e) from the state shown in FIG. 4 and the clamper member 112 is moved to the position where it reaches the horizontal section at the lower part of the slant segment (position 1).

Then, it is kept in a clamped state in which the disk D2-1 is held between the turntable Ta and the damper 114, the disk D2-1 is rotationally driven by the spindle motor and the reproducing operation is carried out through a pick-up element. At this time, each of the disk guides 12aa to 123a of the guide arms 121 to 123 shown in FIG. 35 is driven by a mechanism, not shown, to be moved away from the outer circumferential edge of the disk D2-1 and it does not interfere with the disk D2-1. This is similar applied to the lower guide means 150.

The moving member 107 is constructed such that the bent piece 107c is moved to a predetermined position as the moving member 107 is moved and the photo-sensing switches SW1 to SW4 are turned ON or turned OFF through both side edges of the bent piece 107c and the slit 107c', thereby a predetermined position can be detected. Then, at the position 1, each of the photo-sensing switches SW1 to SW4 detects each of the states of OFF, ON, ON and ON to cause motion of the moving member 107 (106) to be stopped.

Then, the moving pin 118j (118i) of the pressing member 118 ascends on the slant segment of the cam groove 107f' (106f) from the state shown in FIG. 4 in the direction y1 (y2) and is moved up to the position reaching the horizontal segment at the upper side. At this time, the side plates 118a, 118b of the pressing member 118 are rotated from the state shown in FIG. 4 only by a predetermined angle in a clockwise direction as viewed in FIG. 36 around the rotating shafts 118g, 118g' and then the pressing plates 118c, 118d are pivoted and moved.

Thus, under this state, a clearance between the pressing surface 118d' of the pressing plate 118d and an outer circumferential surface of the transferring roller 116 is made narrow as compared with the sate shown in FIG. 4 and to the contrary, a clearance between the pressing surface 118c' of the pressing plate 118c and the outer circumferential surface of the transferring roller 116 is made wide.

In addition, as the side plate 118a (118b) is turned, the engaging shaft 119b (119b') of the distributing plate 119 engaged with the recess 118a-3 (118b-3) is pressed upward, the distributing segment 119a is turned from the state shown in FIG. 4 around the rotating shaft 117 in a counterclockwise direction by a predetermined angle in FIG. 36 and it is pivoted and moved to the upper side (the second state of rotating position). Under this state, the lower surface 119a-2 of the distributing segment 119a becomes a slant surface opposing in inclined state against the insertion/ejection slot 103a.

Then, at the position 1 shown in FIG. 36, the disk D2-1 is arranged at a wide clearance between the pressing surface 118c' and the outer circumferential surface of the transferring roller 116. In addition, during the reproducing operation, the disk D2-1 is held at the surface of the turntable Ta without touching the pressing surface 118c' and the transferring roller 116.

At the position 1, when a new disk D2-2 (refer to FIG. 37) is inserted into the insertion/ejection slot 103a, it is detected by the sensing switch 163, rotation of the spindle motor is stopped and its reproducing operation is stopped.

Figure 37:
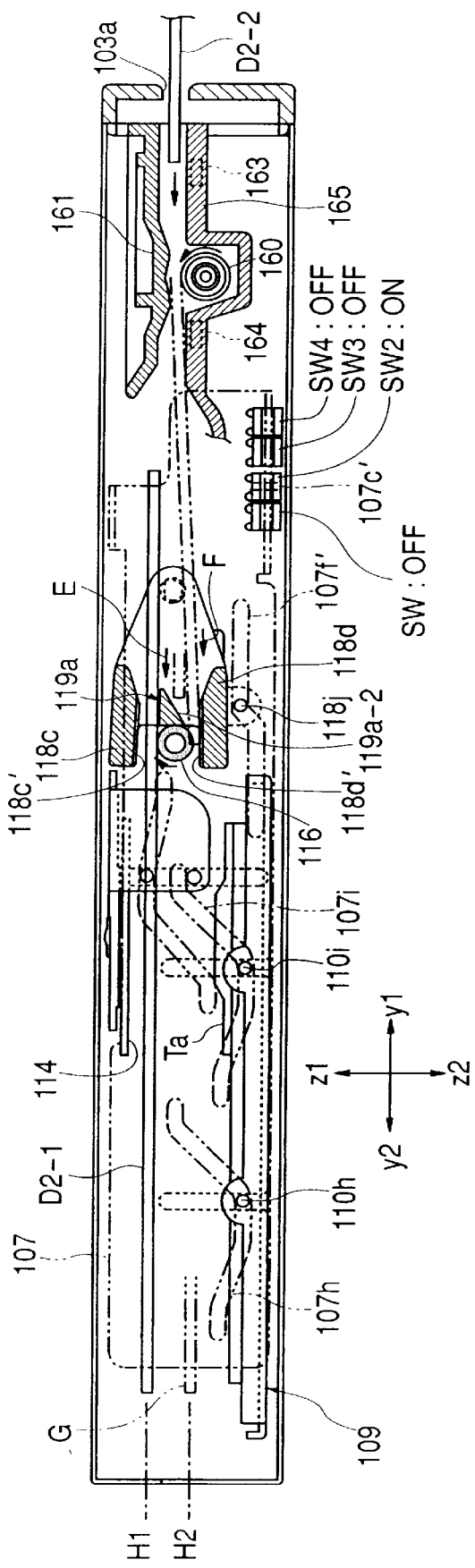
FIG. 37 is an illustrative view related to the disk device of the preferred embodiment of the present invention for illustrating a replacing operation for the disk.

Concurrently, a driving motor (not shown) is started to operate, the driving member 107 is moved in the direction y1. As shown in FIG. 37, when the moving member 107 is moved in the direction y1 shown in the figure, the upper moving pin 113e' of the clamp member 112 ascends from the horizontal segment of the cam groove 107e' on the slant segment in the direction y2, moves up to the horizontal segment of the most ascended upper part and the clamp member 112 is lifted up in the direction z1.

In addition, the moving pins 110h and 110i of the driving unit 109 descend from the horizontal segments of the cam grooves 107h, 107i down on the slant segment in the direction y2, move to the most descended lower horizontal segment and the driving unit 109 is lowered in the direction z2.

Thus, the clamp member 112 and the driving unit 109 are moved away from both surfaces of the disk D2-1 to be spaced apart, respectively, and the disk D2-1 becomes unclamped state (position 2).

At the position 2, the moving member 107 is stopped in its motion by a method in which each of the photo-sensing switches SW1 to SW4 detects states of OFF, ON, OFF and OFF, respectively.

In addition, at the position 2, the moving pin 118j of the pressing member 118 moves only at the horizontal segment of the cam groove 107f' at the same height position as that shown in FIG. 36 and the pressing member 118 keeps the state of position 1 shown in FIG. 36.

Then, as the disk D2-2 is detected, the transferring motor (not shown) starts to operate, and the transferring roller 160 is rotated in a counterclockwise direction acting as a direction drawing the disk D2-2 into the disk device 100 (refer to FIG. 37). The disk D2-2 is inserted by a manual force while its horizontal attitude is kept with the supporting bases 165 arranged before and after the transferring roller 160 being applied as guides.

Then, the extremity of the disk D2-2 at the side y2 enters into the upper part of the transferring roller 160, thereby it is held between the transferring roller 160 and the pressing plate 161 and it is transferred into the deep side of the disk device 100 at the y2 side shown with the transferring force of the transferring roller 160.

As indicated by an arrow E in FIG. 37, the disk D2-2 transferred with its horizontal attitude being maintained is abutted against the lower surface 119a of the distributing segment 119a at the distributing plate 119, thereafter it is moved to slide along the lower surface 119a-2 and the orientation of the disk D2-2 is changed over to the downward direction. In this way, a changing-over mechanism for changing-over the orientation of the disk D is constituted mainly to have the distributing plate 119. Then, as indicated by an arrow F in the figure, it enters into the lower part of the transferring roller 116. This transferring roller 116 is rotated in a clockwise direction in which the disk D22 is drawn into the disk device 100 when the disk D2-2 is detected.

Then, it is held between the transferring roller 116 and the pressing plate 118d and concurrently it is further transferred into a deeper segment of the disk device 100 at the side y2 with a transferring force of the transferring roller 116. At this time, as shown in FIG. 28, the disk D2-2 is pressed by the pressing surface 118d' formed like a notch in the pressing plate 118d, so that the pressing surface 118d' mainly presses both edges of the disk D2-2, resulting in that the central part of the pressing surface 118d' is not contacted with the recording/reproducing surface of the disk D2-2 and damage of the surface of the disk D caused by the transferring operation of the disk D2-2 can be prevented.

Further, the pressing member 118 is constituted such that the moving pins 118i, 118j connected through the supporting plates 118e, 118f having a spring resiliency (refer to FIG. 28) are engaged with the cam grooves 106f, 107f of the moving members 106, 107, and when the disk D2-2 is pressed against the transferring roller 116 by the pressing surface 118d', an appropriate resilient force is given.

Further, the disk D2-2 transferred to the deeper side by the transferring roller 116 is caught in the lower side guide means 150 while its extremity enters into the notch grooves 121a', 122a' of the disk guides 121a, 122a (refer to FIG. 32), and it is further transferred into a deeper side while it is being guided by the guide segments 121a, 122a.

Then, when the disk D2-2 is further transferred and driven by the transferring roller 116, the extremity of the disk D2-2 enters into the notch groove 123a' of the disk guide 123a of the guide arm 123 (refer to FIG. 33) and at the same time, it is pressed to cause the sensing switch 128 to be turned OFF and it is detected that the disk D2-2 is completely loaded at the lower guide means 150 (a state G in FIG. 37).

Figure 38:
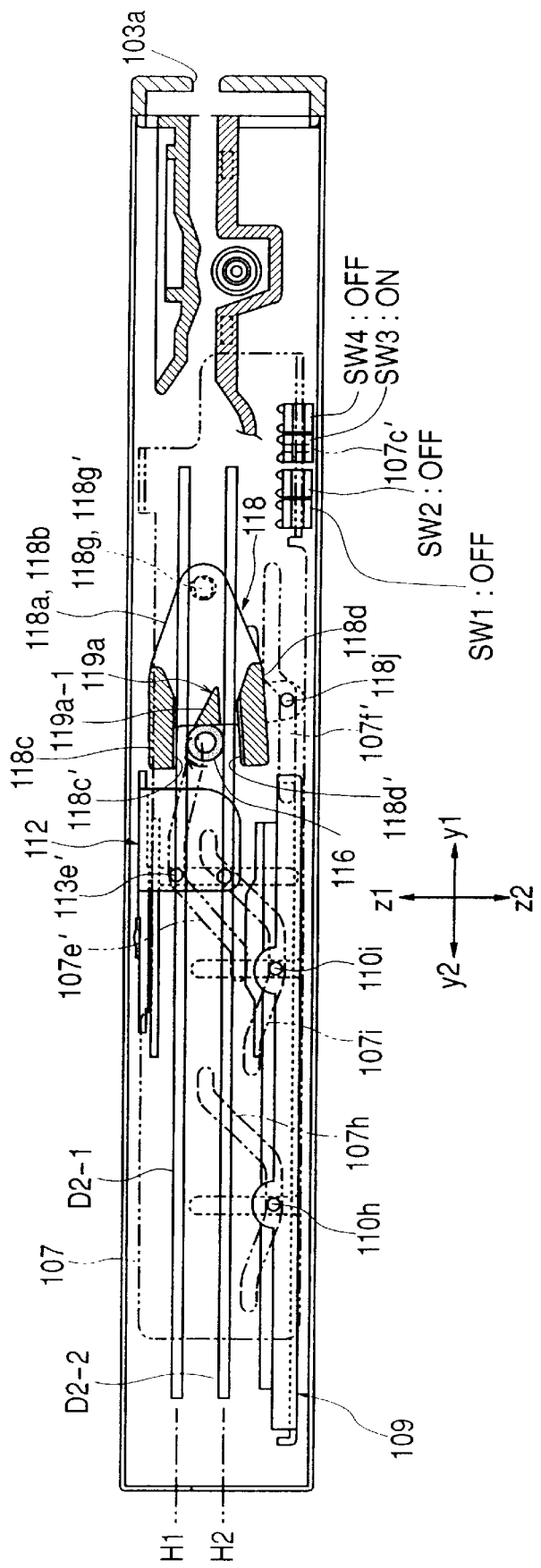
FIG. 38 is an illustrative view related to the disk device of the preferred embodiment of the present invention for illustrating a replacing operation for the disk.

When an OFF signal of the sensing switch 128 is detected, the driving motor is started to operate and the moving member 107 is moved in the direction y1. As shown in FIG. 38, when the moving member 107 is moved in the direction y1 as viewed in the figure, the moving pin 118j of the pressing member 118 descends from the horizontal segment positioned in FIG. 37 down to the slant segment in the direction y2 and further moved to the position where it reaches the horizontal segment at the lower part.

At this time, the side plate 118a (118b) of the pressing member 118 is turned around the rotating shaft 118g (118g') from the state shown in FIG. 37 only by a predetermined angle in a counterclockwise direction as viewed in FIG. 38, and the pressing plates 118c, 118d are turned downwardly and moved.

Thus, under this state, a clearance between the pressing surface 118c' of the pressing plate 118c and the outer circumferential surface of the transferring roller 116 is made narrow and in turn a clearance between the pressing surface 118*d*' of the pressing plate 118*d* and the outer circumferential surface of the transferring roller 116 is made wide (the sate of the first turning position).

In addition, as the side plate 118*a* (118*b*) is turned, the engaging shaft 119*b* (119*b*') of the distributing plate 119 engaged with the notches 118*a*-3 (118*b*-3) of the side plate 118*a* (118*b*) (refer to FIG. 36 for both elements) is pressed downwardly, the distributing segment 119*a* is turned around the rotating shaft 117 only by a predetermined angle in a clockwise direction as viewed in FIG. 38 from the state in FIG. 37 and further turned downwardly and moved. Under this state, the upper surface 119*a*-1 of the distributing segment 119*a* becomes a slant surface opposing against the insertion/ejection slot 103*a* in a slant orientation.

In addition, at the position 2, the moving pin 113*e*' at the upper side of the clamp member 112 is moved at the horizontal segment in the same position as that in FIG. 37 of the cam groove 107*e*', the moving pins 110*h*, 110*i* of the driving unit 109 are moved only at the horizontal segment at the same height position as that in FIG. 37 of the cam grooves 107*h*, 107*i*, and the clamp member 112 and the driving unit 109 keep the state of the position 2 indicated in FIG. 37.

At the position 3, the moving member 107 is made such that its motion is stopped by a method wherein each of the photo-sensing switches SW1 to SW4 detects the states of OFF, OFF, ON and ON, respectively.

Figure 39:
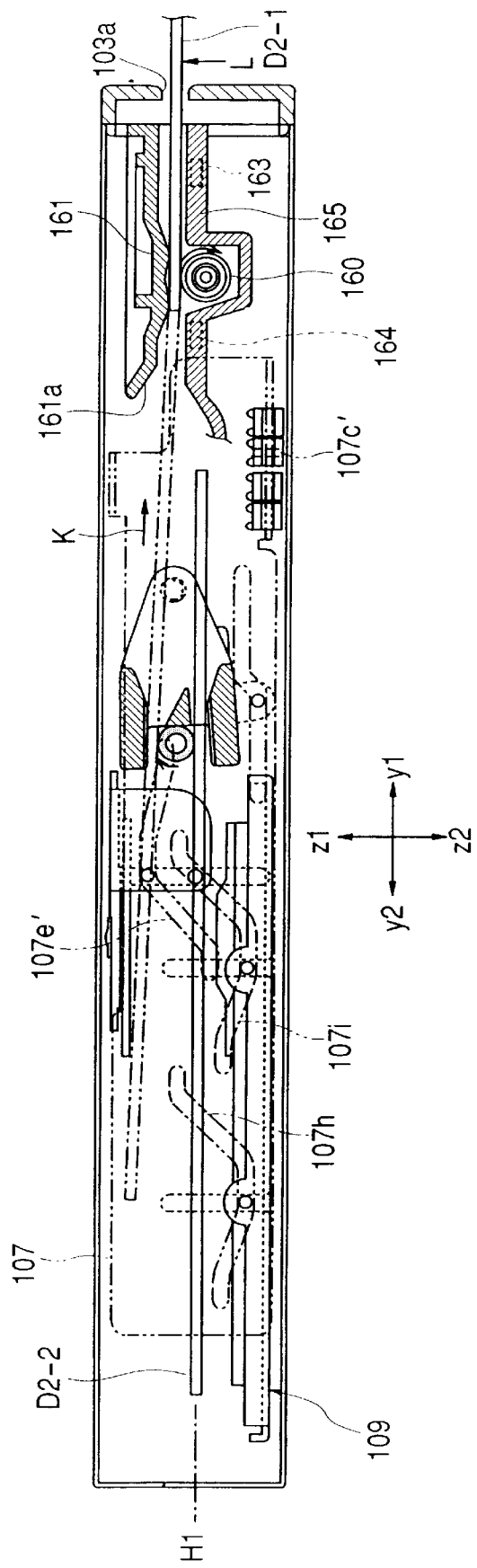
FIG. 39 is an illustrative view related to the disk device of the preferred embodiment of the present invention for illustrating a replacing operation for the disk.

Then, at the position 3, the transferring roller 116 is turned in a clockwise direction in sequence from a state of the position 2 shown in FIG. 37, the disk D2-1 is held by the pressing surface 118*c*' of the pressing plate 118*c* and the transferring roller 116, thereby the disk D2-1 is transferred from the first driving position H1 at the upper guide means 151 toward the insertion/ejection slot 103*a* as indicated by an arrow K in FIG. 39.

At this time, the end part at the y1 side of the disk D2-1 is fed while being slid along the lower surface 161*a* of the pressing plate 161, thereafter it is held between the upper side of the transferring roller 160 and the pressing plate 161. A transferring force of the transferring roller 160 in a clockwise direction is supplied to the disk D2-1 to cause the disk to be transferred to the direction y1 and the disk is finally ejected out of the insertion/ejection slot 103*a*.

At this time, when the end part of the disk D2-1 in the direction y2 is positioned at a location slightly passed by the sensing switch 164 (the state L in FIG. 39), the sensing switch 164 detects the end part of the disk D2-1 in the direction y2 so as to stop rotation of both transferring roller 160 and the transferring roller 116.

With such an arrangement as above, it becomes possible that the end part of the disk D2-1 in the direction y2 is stopped under a state in which the end part is being held between the transferring roller 160 and the pressing plate 161 and a dropping of the disk D2-1 is prevented when the disk is ejected from the device. In addition, ejection of the disk D2-1 out of the disk device 100 can be easily performed by slightly drawing out the disk D2-1 manually in the direction y1.

Figure 40:
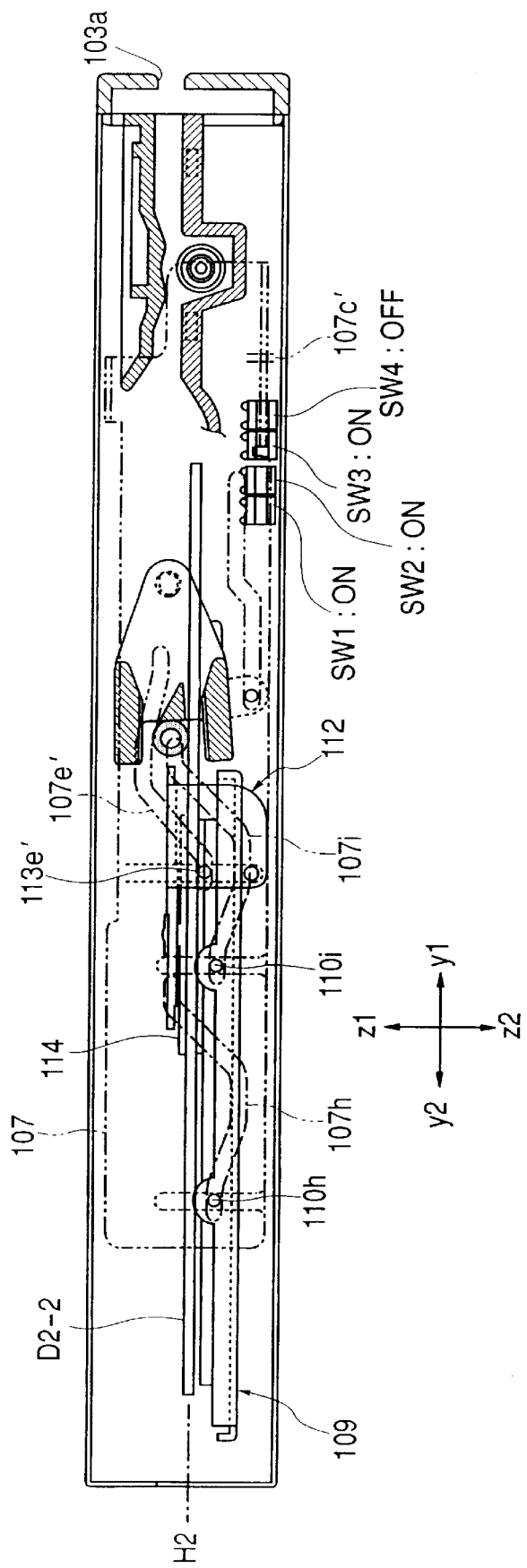
FIG. 40 is an illustrative view related to the disk device of the preferred embodiment of the present invention for illustrating a replacing operation for the disk.
Figure 41A:
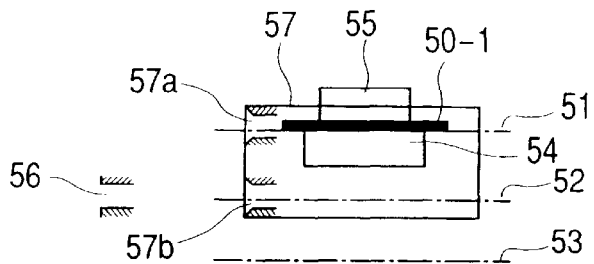
FIGS. 41A–41F are illustrative views illustrating a replacing operation for the disk in a conventional art disk device.
Figure 41B:
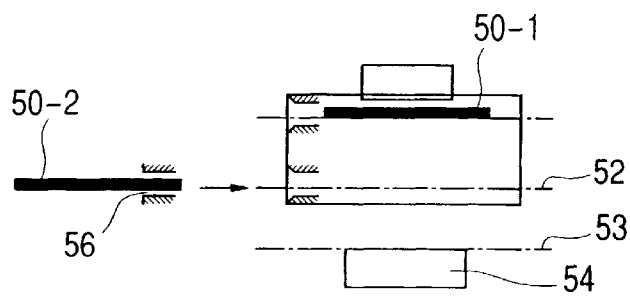
Figure 41C:
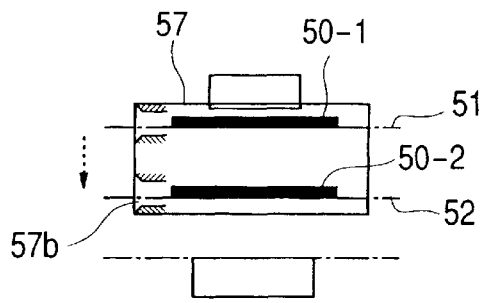
Figure 41D:
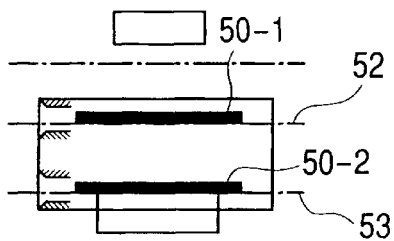
Figure 41E:
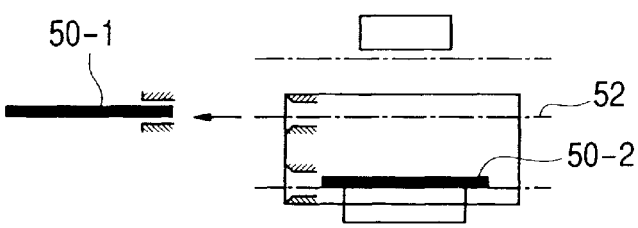
Figure 41F:
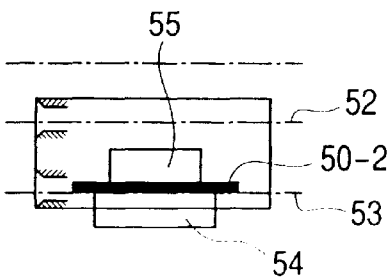

Next, upon sensing of completion of ejection operation of the disk D2-1 by the sensing switch 163, the moving member 107 is moved again in the direction y1. As shown in FIG. 40, when the moving member 107 is moved in the direction y1 shown in the figure, the upper moving pin 113*e*' of the clamp member 112 descends from the horizontal segment at the position in FIG. 39 of the cam groove 107*e*' down on the slant segment in the direction y2, moves and reaches up to the horizontal segment in the direction y2 and further the clamp member 112 is descended down to a lower position than the position 1 (refer to FIG. 36) in the direction z2.

In addition, the moving pins 110*h*, 110*i* of the driving unit 109 ascend from the horizontal segments at the positions in FIG. 39 of the cam grooves 107*h*, 107*i* on the slant segment in the direction y2, move upward, reach up to the horizontal segments in the direction y2, and the driving unit 109 is ascended to the lower position than the position 1 (refer to FIG. 36) in the direction z1.

During this process, the disk D2-2 being held at the lower guide means 150 is mounted on the turntable Ta. Then, since the clamper 114 of the clamp member 112 is engaged with the turntable Ta, it becomes a clamped state (position 4) in which the disk D2-2 is held between the turntable Ta and the clamper 114.

At the position 4, the moving member 107 is stopped in its motion by a method in which each of the photo-sensing switches SW1 to SW4 detects the states of ON, ON, ON and OFF, respectively.

Then, at the position 4, a reproducing operation of the disk D2-2 is carried out by the recording/reproducing means (not shown) arranged at the driving unit 109.

Next, in reference to FIGS. 36 to 40, a case in which a new disk D2-3, not shown, is inserted into the insertion/ejection slot 103*a* when the reproducing operation is being performed at the driving position H2 for the disk D2-2 will be described in brief.

When the disk D2-3 is inserted into the insertion/ejection slot 103*a*, this state is detected by the sensing switch 163 and the recording/reproducing operation of the disk D2-2 is stopped. Then, the moving member 107 is moved to the position 3 shown in FIG. 38. Thus, the clamp member 112 ascends and moves along the cam groove 107*e*' and the driving unit 109 descends and moves along the cam grooves 107*h*, 107*i*, thereby the clamper 114 and the turntable Ta are moved away and the disk D2-2 becomes unclamped state.

Under this state, although the disk D2-3 is transferred into the disk device 100, its operation during its transferring state is similar to that described above. However, the transferring roller 116 is rotated in a counterclockwise direction, a transferring direction of the disk D2-3 is changed over to upper one along the upper surface 119*a*-1 of the distributing segment 119*a* and it is held at the driving position H1 in the upper guide means 151.

Further, when the moving member 107 is moved in the direction y2 and positioned at the position 2 shown in FIG. 37, the disk D2-2 is held by the pressing surface 118*d*' of the pressing plate 118*d* and by the transferring roller 116 and at the same time the disk is transferred toward the side of insertion/ejection slot 103*a*. At this time, the transferring roller 116 is turned in a counterclockwise direction.

Then, the disk D2-2 is transferred through the insertion/ejection slot 103*a* out of the disk device 100 under a state in which the disk D2-2 is held between the transferring roller 160 and the pressing plate 161 under a clockwise rotation of the transferring roller 160.

Upon completion of transferring of the disk D2-2, the moving member 107 is moved in the direction y2 and located at the position 1 shown in FIG. 36, the clamp member 112 descends along the slant segment of the cam groove 107*e*' and reaches up to the driving position H1.

Then, the driving chassis 109 ascends along the slant segments of the cam grooves 107h, 107i and similarly reaches up to the driving position H1.

Then, the clamper 114 is engaged with the turntable Ta, the disk D2-3 is held and clamped there and a reproducing operation for the disk D2-3 is carried out by the recording/reproducing means (not shown) arranged at the driving unit 109.

As described above, in the case of the disk drive device 100, the disk D can be driven at two locations where the clamp member 112 and the driving chassis 109 are placed at the first driving position H1 and the second driving position H2. For example, when a new disk D is inserted through the insertion/ejection slot 103a while the clamp member 112 and the driving chassis 109 are placed at the first driving position H1 and the second driving position H2 and the disk D is being driven, the disk D is replaced at a process in which the clamp member 112 and the driving chassis 109 are moved to the second driving position H2 and then the new disk D is driven at the second driving position H2.

In addition, to the contrary, in the case that a new disk D is inserted while the clamp member 112 and the driving chassis 109 are placed at the second driving position and the disk D is being driven, the disk D is replaced at a process in which the clamp member 112 and the driving chassis 109 are moved to the first driving position H1 and then the new disk D is driven at the first driving position H1.

At this time, in the case that the new disk D is transferred to either the first or the second driving positions H1, H2 in the disk device 100, an orientation of the disk D is changed over to any one of the positions H1, H2 by the distributing plate 119, and it can be directly transferred into either the first or second driving position H1 or H2 arranged on its transferring path, so that it is not necessary to arrange it as found in the prior art that the disk is held once by the holding means, the holding means is moved up and down to move the disk to its predetermined position, resulting in that a transferring time for the disk D2 can be shortened and also a replacement time for the disk D can be shortened. Further, also at the time of unloading the disk D, the disk can be directly transferred in inverse manner from either the first or the second driving position H1, H2 to the insertion/ejection slot 103a and can be taken out of the device, so that it is not necessary to arrange it as found in the prior art that the disk is held once by the holding means, the holding means is moved up and down to move the disk to its inserting or ejecting slot, and further a replacing time for the disk D can be further shortened.

Further, since the ejected disk is held near the insertion/ejection slot 103a, it is possible to prevent the disk from being dropped. That is, it is not necessary to remove the ejected second disk immediately. Thus, if the device of the present invention is used as a vehicle-mounted disk device, the disk can be left until the vehicle stops, for example, so that it is not necessary to remove the disk during driving of the vehicle and its operability can be improved. In addition, re-loading of the ejected disk into the device enables the disk to be replaced with another disk.

In the foregoing description, the state in which the first disk is already present within the disk device 100 when the new disk is to be transferred to either the first or second driving position H1, H2 has been described, although it is of course apparent that a mere loading of a new disk at the insertion/ejection slot 103a enables the disk to be loaded in the device also in the case that the new disk is loaded when the first disk is not present in the disk device 100.

Further, the foregoing has described the replacement work for the disk D when the normal size disk D2 is applied, although the present invention can also be applied to the small diameter type disk D1.

As described above, in accordance with the present invention, there is provided a disk device comprising one insertion/ejection slot for inserting or ejecting a disk, a transferring means for transferring the disk inserted into the insertion/ejection slot to a position where it can be driven, and a driving unit ascended or descended in a direction crossing at a right angle with a disk surface of the disk transferred to the position where it can be driven and for driving the disk while mounting it thereon, wherein a first driving position and a second driving position where the disk is driven are set at different positions along the ascending or descending direction of the driving unit, the transferring means has a distributing mechanism for selectively changing over a transferring direction of the disk to either the first driving position or the second driving position, and when a next disk is inserted into the insertion/ejection slot under a state in which the disk is present at one of the driving positions of either the first driving means or the second driving position, the next disk inserted is transferred to the other driving position where no disk is present, the disk already present is ejected out of the insertion/ejection slot, resulting in that the next disk is driven by the driving unit, thereby, in the case that a new disk is inserted into the device while the disk is being driven at the first driving position, for example, a replacement of the disk is carried out at a stage where the driving unit is moved to the second driving position, the new disk can be driven at the second driving position, and to the contrary, in the case that a new disk is inserted into the device while the disk is being driven at the second driving position, a replacement of the disk is carried out at a stage where the driving unit is moved to the first driving position, the new disk can be driven at the first driving position, and at this time, when the new disk is transferred to either the first or the second driving position, the disk is changed over in its orientation by the distributing mechanism to any direction toward either the first driving position or the second driving position, the disk can be directly transferred into the first or second driving position arranged on the forwarding path, so that the present invention can avoid it as found in the prior art that the disk is once held by a holding means, the holding means is moved up and down to transfer the disk to its predetermined driving position, a transferring time for the disk can be shortened and a replacement time for the disk can be shortened.

There is provided a disk device comprising one insertion/ejection slot for inserting or ejecting a disk, a transferring means for transferring the disk inserted into the insertion/ejection slot, and a driving unit which can be ascended or descended in a direction crossing at a right angle with a disk, wherein each of a first driving position and a second driving position is set at different positions of the directions crossed at a right angle, the transferring means has a distributing mechanism for selectively changing over a transferring direction of the inserted disk to either the first driving position or the second driving position, the disk transferred by the transferring means to either the first driving position or the second driving position is loaded by the driving unit ascended or descended in correspondence with the disk, the disk is driven, and when a new disk is inserted under a state in which the disk is being driven, for example, a replacement of the disk is performed at a state in which the driving unit is moved to the second driving position, the new disk can be driven at the second driving position, and to the contrary, in the case that a new disk is inserted into the device while the disk is being driven at the second driving position, a replacement of the disk is carried out at a stage where the driving unit is moved to the first driving position, the new disk can be driven at the first driving position, and at this time, when the new disk is transferred to either the first or the second driving position, the disk is changed over in its orientation by the distributing mechanism to any direction toward either the first driving position or the second driving position, the disk can be directly transferred into the first or second driving position arranged on the forwarding path, so that the present invention can avoid it as found in the prior art that the disk is once held by a holding means, the holding means is moved up and down to transfer the disk to its predetermined driving position, a transferring time for the disk can be shortened and a replacement time for the disk can be shortened.

Further, when a new disk is inserted from the insertion/ejection slot, the disk is transferred by the transferring means to a vacant position of either the first or the second position, the disk which has already been transferred into the disk device is transferred in reverse direction on the transferring path into the disk device, the disk is transferred out to the insertion/ejection slot, and the disk can be directly drawn out from either the first or the second driving position to the insertion/ejection slot similarly in the case of transferring out the disk, so that the present invention can avoid it as found in the prior art that the disk is once held by a holding means, the holding means is moved up and down to transfer the disk to its inserting or ejecting position, a transferring time for the disk can be shortened and a replacement time for the disk can be shortened.

The transferring means has a transferring roller and a pressing member, the disk is held between the transferring roller and the pressing member and the transferring roller is rotated to transfer the disk, so that the transferring of the disk can be performed by a simple mechanism and the structure of the disk device can be simplified.

Further, the distributing mechanism has two opposed slant surfaces which can be selectively changed over against the insertion/ejection slot, the extremity of the disk inserted from the insertion/ejection slot is abutted against one slant surface and moved along the slant surface, thereby the transferring direction of the disk is changed over toward the first driving position and further abutted against the other slant surface to be changed over to the second driving position, thereby a mere abutting of the extremity of the disk against a predetermined slant surface enables its orientation to be changed over to either the first or second driving position, so that the distributing mechanism can be constituted by a simple mechanism and a structure of the disk device can be further simplified.

Further, the distributing mechanism has a distributing plate turned in such a direction as one crossing at a right angle with the surface of the disk, an opposing surface against the insertion/ejection slot at the first rotating position of the distributing plate is applied as one slant surface and the opposing surface at the second rotating position is applied as the other slant surface, thereby the distributing mechanism can be constituted by applying the plate-like distributing plate having a simple shape and the distributing mechanism can be simply constituted without making its structure complex.

What is claimed is:

1. A disk device comprising:
one insertion/ejection slot for inserting or ejecting a disk; and
a driving unit ascended or descended in a direction crossing at a right angle with a disk surface of the disk inserted in the insertion/ejection slot to drive the disk while clamping it thereon,
wherein a first driving position and a second driving position where the disk is driven are set at different positions along the ascending or descending direction of the driving unit;
wherein a transferring means is provided with a distributing mechanism for selectively changing over a transferring direction of the disk inserted into the insertion/ejection slot to either the first driving position or the second driving position, and transfers the disk distributed by the distributing mechanism to the first driving position or the second driving position, the distributing mechanism having a distributing member supported to pivot up and down in order to guide the disk inserted into the insertion/ejection slot diagonally upward or diagonally downward; and
wherein, when a next disk is inserted into the insertion/ejection slot under a state in which the preceding disk is present at one of the first driving position and the second driving position, the next disk inserted is distributed and transferred to the other driving position where the preceding disk is not present by the distributing member, the disk already present is ejected out of the insertion/ejection slot, and the next disk is driven by the driving unit in the other driving position.

2. A disk device according to claim 1, wherein when the new disk is inserted through the insertion/ejection slot, the disk is transferred by the transferring means to a vacant position of the first driving position or second driving position, and the disk already transferred into the disk device is transferred in reverse in the transferring path of the disk into the disk device and transferred out to the insertion/ejection slot.

3. A disk device according to claim 1, wherein
the transferring means has transferring rollers and pressing members, the disk is held between the transferring rollers and the pressing members and the transferring rollers are rotated to transfer the disk.

4. A disk device according to claim 1, wherein the distributing mechanism has two opposed slant surfaces which can be selectively changed over against the insertion/ejection slot, wherein the extremity of the disk inserted from the insertion/ejection slot is abutted against one of the slant surfaces and moved along that slant surface, whereby the transferring direction of the disk is changed over toward the first driving position and further abutted against the other the slant surface to be changed over to the second driving position.

5. A disk device according to claim 4, wherein the distributing mechanism has a distributing plate turned in a direction crossing at a right angle with the surface of the disk, an opposing surface against the insertion/ejection slot at the first turning position of the distributing plate is applied as one slant surface and the opposing surface at the second turning position is applied as the other slant surface.

* * * * *